(12) United States Patent
Grip

(10) Patent No.: US 8,650,811 B2
(45) Date of Patent: Feb. 18, 2014

(54) SOLAR COLLECTOR FRAME

(75) Inventor: Robert Erik Grip, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/021,646

(22) Filed: Feb. 4, 2011

(65) Prior Publication Data

US 2012/0199115 A1   Aug. 9, 2012

(51) Int. Cl.
*E04D 13/18* (2006.01)

(52) U.S. Cl.
USPC ........ 52/173.3; 126/600; 136/243; 250/203.1

(58) Field of Classification Search
USPC ............... 52/6–10, 173.3; 126/600, 623, 680, 126/684, 696, 698, 704; 136/243–246; 250/203.1, 203.3, 203.4
See application file for complete search history.

(56) References Cited

U.S. PATENT DOCUMENTS

| | | | |
|---|---|---|---|
| 2,399,461 A | 4/1946 | Brown | |
| 2,720,367 A | 10/1955 | Doolittle | |
| 3,193,214 A | 7/1965 | Hollingsworth | |
| 3,302,602 A | 2/1967 | Korganoff | |
| 3,572,611 A | 3/1971 | Oulton | |
| 3,623,444 A | 11/1971 | Lang | |
| 3,698,668 A | 10/1972 | Cole et al. | |
| D230,893 S | 3/1974 | Arruda | |
| 3,815,773 A | 6/1974 | Duvall et al. | |
| 3,848,558 A | 11/1974 | Henry | |
| 3,897,743 A | 8/1975 | Schoonman | |
| 3,937,208 A | 2/1976 | Katz et al. | |
| 3,994,452 A | 11/1976 | Cole | |
| 4,012,016 A | 3/1977 | Davenport | |
| 4,053,124 A | 10/1977 | Cole | |
| 4,069,811 A | 1/1978 | Tabor | |
| 4,102,086 A * | 7/1978 | Korman | ............... 52/9 |
| 4,165,846 A | 8/1979 | Groeger | |
| 4,200,253 A | 4/1980 | Rowarth | |
| 4,247,066 A | 1/1981 | Frost et al. | |
| 4,252,287 A | 2/1981 | Zimmer | |
| 4,330,151 A * | 5/1982 | Healey | ............ 297/158.3 |
| 4,351,502 A | 9/1982 | Statkus | |

(Continued)

FOREIGN PATENT DOCUMENTS

| | | |
|---|---|---|
| EP | 1205383 | 5/2002 |
| EP | 2090848 | 8/2009 |

(Continued)

OTHER PUBLICATIONS

U.S. Appl. No. 12/398,951, filed Mar. 5, 2009, Grip.

(Continued)

*Primary Examiner* — Brian Glessner
*Assistant Examiner* — Beth Stephan
(74) *Attorney, Agent, or Firm* — Yee & Associates, P.C.

(57) ABSTRACT

An apparatus comprising a number of platforms and a number of beams. The number of platforms has a first side and a second side. Each platform in the number of platforms is comprised of a number of devices. The number of beams is connected to the second side of the number of platforms at a plurality of connection points. The plurality of connection points is configured such that an orientation of the number of platforms remains substantially unchanged in response to a load on the number of platforms.

21 Claims, 20 Drawing Sheets

(56) References Cited

U.S. PATENT DOCUMENTS

| | | | |
|---|---|---|---|
| 4,429,844 A | 2/1984 | Brown et al. | |
| 4,475,702 A | 10/1984 | Cole | |
| 4,553,722 A | 11/1985 | Cole | |
| 4,650,140 A | 3/1987 | Cole | |
| 4,706,913 A | 11/1987 | Cole | |
| 5,237,952 A | 8/1993 | Rowe | |
| 5,242,132 A | 9/1993 | Wukowitz | |
| 5,373,800 A | 12/1994 | Steinberg | |
| 5,415,365 A | 5/1995 | Ratliff | |
| 5,653,404 A | 8/1997 | Ploshkin | |
| 5,788,184 A | 8/1998 | Eddy | |
| 5,887,828 A | 3/1999 | Appa | |
| 6,010,098 A | 1/2000 | Campanile et al. | |
| 6,202,442 B1 | 3/2001 | Brugerolle | |
| 6,474,024 B1* | 11/2002 | Macintyre | 52/9 |
| 6,558,823 B1 | 5/2003 | Pinney | |
| 6,559,370 B1 | 5/2003 | Barker | |
| 6,565,037 B1 | 5/2003 | Tonkovich | |
| 6,644,599 B2 | 11/2003 | Perez | |
| 6,655,313 B1 | 12/2003 | Woodall et al. | |
| 6,796,534 B2 | 9/2004 | Beyer et al. | |
| 6,848,647 B2 | 2/2005 | Albrecht | |
| 6,860,449 B1 | 3/2005 | Chen | |
| 6,959,993 B2* | 11/2005 | Gross et al. | 359/853 |
| 7,097,136 B2 | 8/2006 | Ruszkowski, Jr. | |
| 7,131,389 B1 | 11/2006 | Hawkes | |
| 7,156,342 B2 | 1/2007 | Heaven, Jr. et al. | |
| 7,252,264 B2 | 8/2007 | Nattinger | |
| 7,264,206 B2 | 9/2007 | Wheaton et al. | |
| 7,270,305 B2 | 9/2007 | Rampton et al. | |
| 7,306,187 B2 | 12/2007 | Lavan | |
| 7,322,547 B2 | 1/2008 | Konings | |
| 7,338,018 B2 | 3/2008 | Huynh et al. | |
| 7,487,936 B2 | 2/2009 | Heaven, Jr. | |
| 7,530,533 B2 | 5/2009 | Perez-Sanchez | |
| 7,699,270 B2 | 4/2010 | Lonsinger et al. | |
| 7,797,889 B2 | 9/2010 | McClintock et al. | |
| 7,858,875 B2* | 12/2010 | Lu | 136/246 |
| 7,878,192 B2 | 2/2011 | Larsen | |
| 7,900,402 B2* | 3/2011 | Staten et al. | 52/10 |
| 7,905,227 B2 | 3/2011 | Luconi et al. | |
| 7,913,485 B2 | 3/2011 | Butler et al. | |
| 7,918,421 B2 | 4/2011 | Voglsinger et al. | |
| 7,938,358 B2 | 5/2011 | Dietrich et al. | |
| 8,056,865 B2 | 11/2011 | Grip | |
| 8,188,414 B2* | 5/2012 | Linke | 250/203.4 |
| 8,205,829 B2 | 6/2012 | Bossert et al. | |
| 2003/0200703 A1* | 10/2003 | Suprina | 52/9 |
| 2005/0229924 A1* | 10/2005 | Luconi et al. | 126/696 |
| 2006/0049301 A1 | 3/2006 | Yam et al. | |
| 2006/0054162 A1* | 3/2006 | Romeo | 126/600 |
| 2006/0157623 A1 | 7/2006 | Voglsinger et al. | |
| 2007/0063099 A1 | 3/2007 | Holloman, Jr. | |
| 2007/0152106 A9 | 7/2007 | Perez-Sanchez | |
| 2008/0163864 A1 | 7/2008 | Larson | |
| 2008/0230047 A1* | 9/2008 | Shugar et al. | 126/569 |
| 2010/0200689 A1 | 8/2010 | Grip | |
| 2010/0224734 A1 | 9/2010 | Grip | |
| 2011/0001000 A1 | 1/2011 | Zhu | |
| 2011/0017876 A1 | 1/2011 | Manley et al. | |
| 2011/0099915 A1* | 5/2011 | Sudkamp et al. | 52/9 |
| 2011/0155840 A1 | 6/2011 | Lind, Jr. et al. | |
| 2012/0056038 A1 | 3/2012 | Grip | |

FOREIGN PATENT DOCUMENTS

| | | | |
|---|---|---|---|
| EP | 2136156 A2 * | 12/2009 | F24J 2/54 |
| FR | 2610254 | 8/1988 | |
| JP | 2003343048 | 12/2003 | |
| WO | 0247976 | 6/2002 | |
| WO | 2010063018 | 6/2010 | |
| WO | 2010101699 | 9/2010 | |

OTHER PUBLICATIONS

U.S. Appl. No. 12/368,559, filed Feb. 10, 2009, Grip.

PCT Search Report with Written Opinion dated Sep. 2, 2010 regarding international application No. PCT/US2010/023503, applicant The Boeing Company, 14 pages.

PCT Search Report with Written Opinion dated Apr. 18, 2012 regarding international application No. PCT/US2011/066246, applicant The Boeing Company, 9 pages.

Chivers, "Pentagon plans 'flying submarine'", The Telegraph, Telegraph Media Group Ltd, Jul. 2010, 2 pages.

Davis et al., "Development of the Variable Camber System for a Supercritical Wing", General Dynamics Fort Worth Division, Technical Report AFFDL-TR-76-65, Jul. 1976, 381 pages.

"Manta Fighter from "Sky Captain & The World of Tomorrow" 1:72 Scale", Fantastic Plastic, retrieved Aug. 16, 2011, 4 pages http://www.fantastic-plastic.com/SkyCaptainMantaFighterCatalogPage.htm.

Marks, "From sea to sky: Submarines that fly", New Scientist, Issue 2767, Jul. 2010, 6 pages.

USPTO Office Action dated Sep. 12, 2011 for U.S. Appl. No. 12/368,559, 16 pages.

USPTO Final Office Action dated Mar. 1, 2012 for U.S. Appl. No. 12/368,559, 13 pages.

USPTO Notice of Allowance dated Sep. 19, 2011 for U.S. Appl. No. 12/398,951, 14 pages.

Non-final office action dated Aug. 28, 2012 regarding U.S. Appl. No. 13/295,988, 13 pages.

Notice of Allowance, dated Apr. 2, 2013, regarding USPTO U.S. Appl. No. 12/368,559, 20 pages.

* cited by examiner

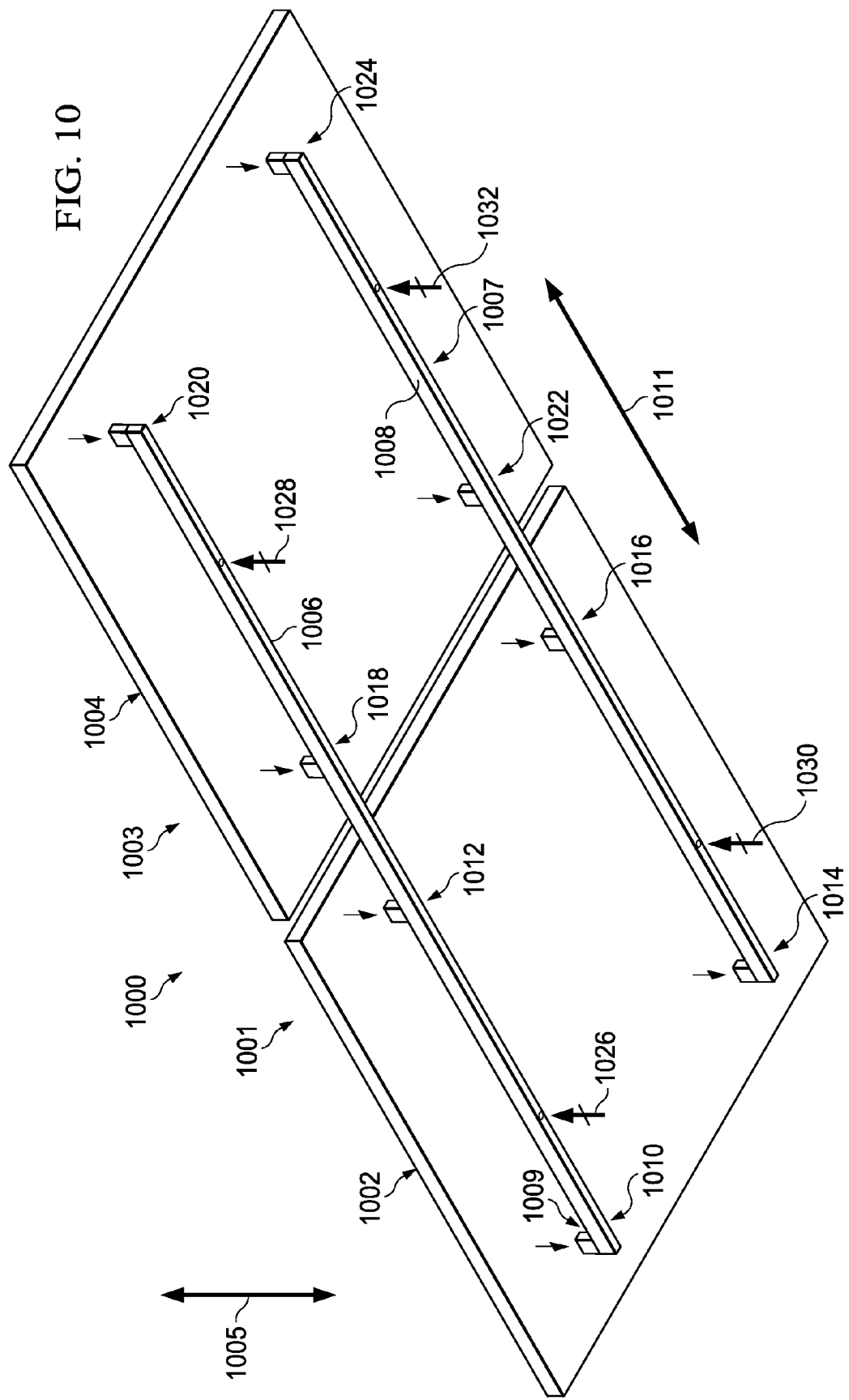

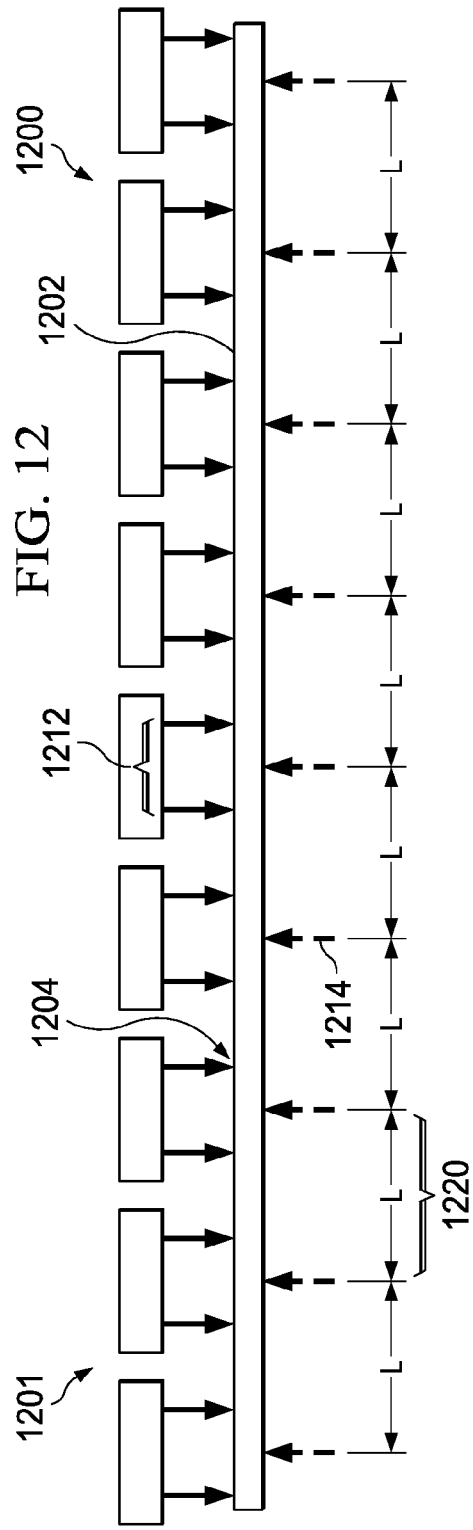
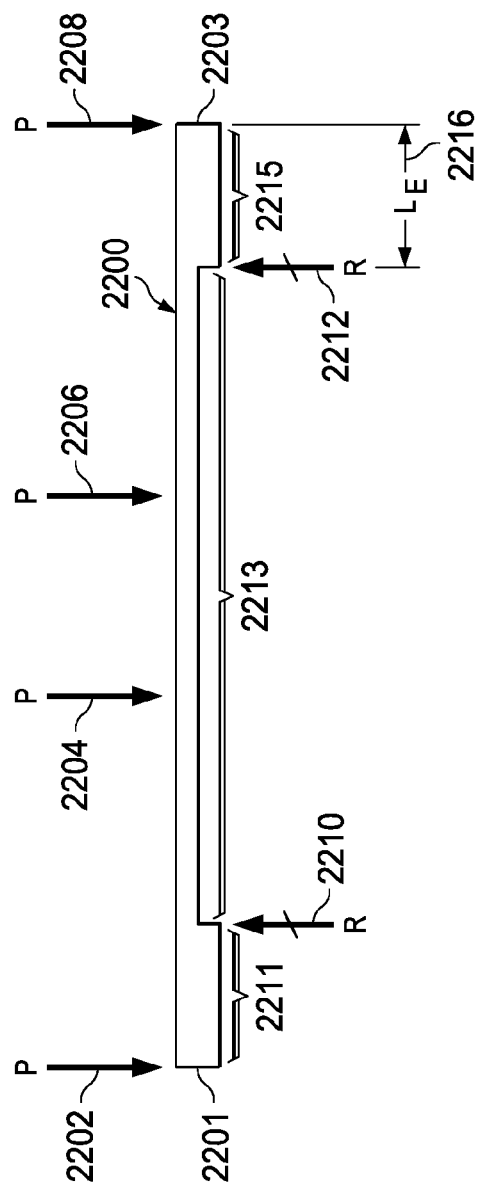

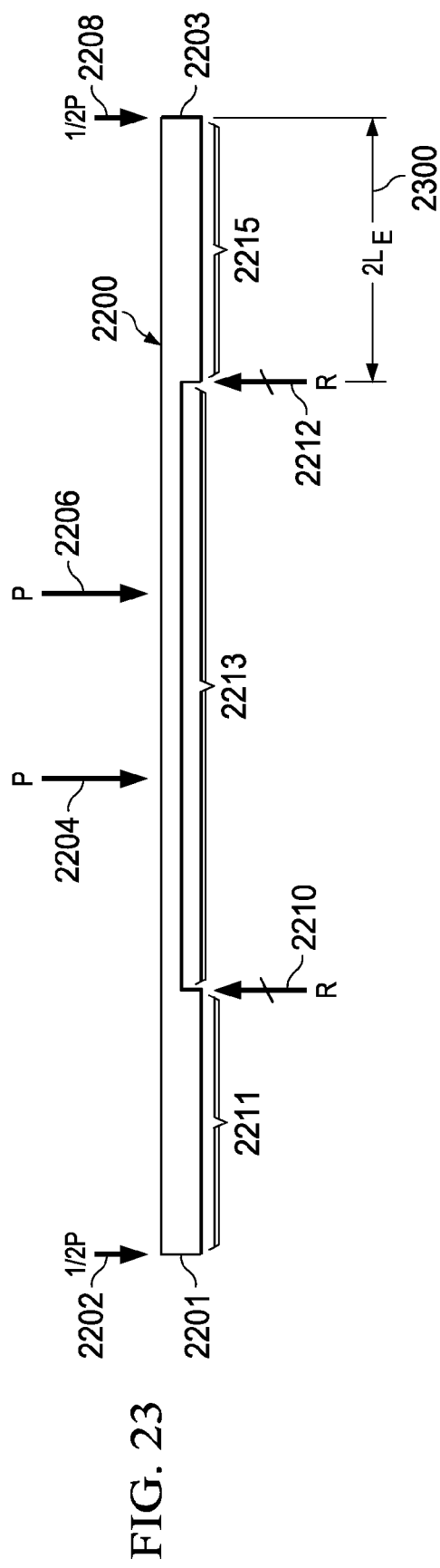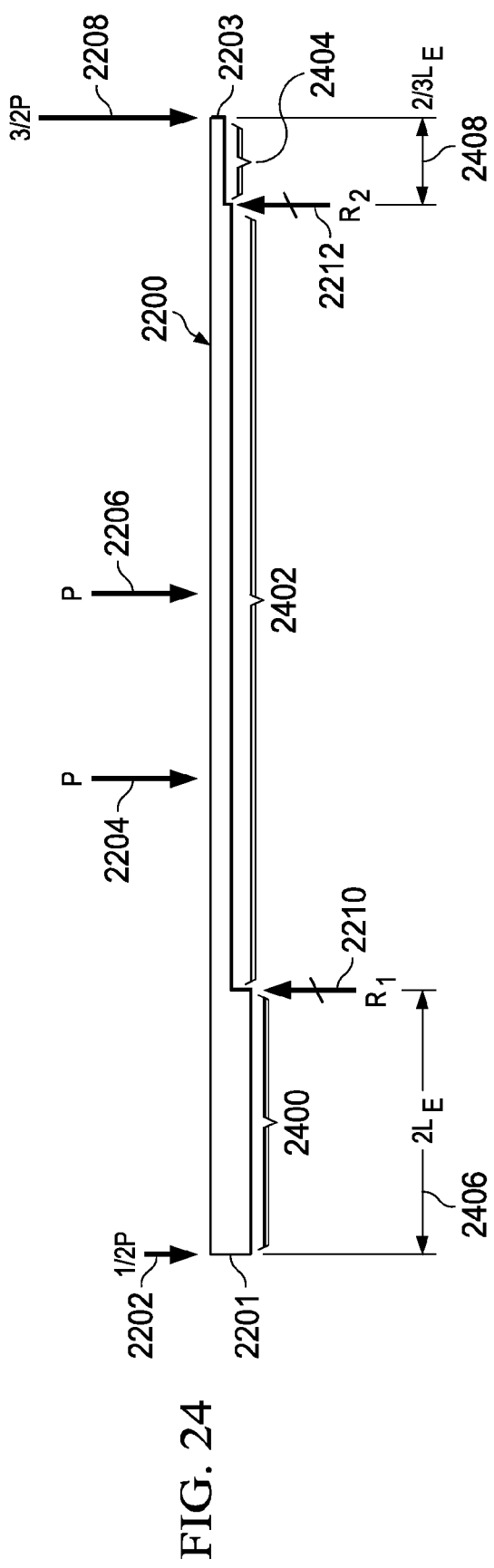

SOLAR COLLECTOR FRAME

BACKGROUND INFORMATION

1. Field

The present disclosure relates generally to solar power systems and, in particular, to solar power collectors. Still more particularly, the present disclosure relates to a method and apparatus for pointing solar power collectors.

2. Background

Solar power may involve converting solar radiation into electricity through solar cells. The solar cells are solid state devices that convert sunlight into electricity using a photovoltaic effect. Assemblies of these solar cells form solar modules, which are also referred to as solar collectors or just collectors.

Solar power plants use large numbers of these collectors. A collector may have different sizes. For example, a collector may be from about two square meters in size to over 10 square meters in size.

With the use of solar cells that employ photovoltaics to generate electricity, the orientation of these collectors may affect the amount of electricity generated. It is desirable to have a vector normal to the surface of a collector directed or pointed towards the sun. As the orientation of the collector deviates from this desired direction, the amount of electricity generated by the collector may decrease.

Depending on the particular system, the tolerance or range in pointing the collectors may be important in increasing the amount of electricity that can be generated by the collectors.

In some solar power systems, concentrating photovoltaics are used. These types of systems may include lenses, mirrors, or a combination of the two to focus sunlight on the photovoltaic cells in the collectors. These concentrators may increase the concentration ratio. For example, the concentration ratio may be about 400 to about 1,000 times the amount of light received from unconcentrated sunlight. With collectors that employ concentrators, the accuracy in pointing the collector towards the sun may be even more important, as compared to collectors that do not use concentrators.

Therefore, it would be advantageous to have a method and apparatus that takes into account at least some of the issues discussed above, as well as possibly other issues.

SUMMARY

In one advantageous embodiment, an apparatus comprises a number of platforms and a number of beams. The number of platforms has a first side and a second side. Each platform in the number of platforms is comprised of a number of devices. The number of beams is connected to the second side of the number of platforms at a plurality of connection points. The plurality of connection points is configured such that an orientation of the number of platforms remains substantially unchanged in response to a load on the number of platforms.

In another advantageous embodiment, an apparatus comprises a number of platforms and a number of beams. The number of platforms has a first side and a second side. Each platform in the number of platforms comprises a number of devices. The number of beams is connected to the second side of the number of platforms at a plurality of connection points. The plurality of connection points is configured to receive a plurality of loads applied at the plurality of connection points in response to a load on the number of platforms and wherein at least a portion of the plurality of connection points is configured to move in response to the load on the number of platforms, such that an orientation of the number of platforms remains substantially unchanged in response to the load on the number of platforms.

In yet another advantageous embodiment, a method is provided for managing an orientation of a number of platforms. A selected orientation for the number of platforms is identified. The number of platforms has a first side and a second side opposite to the first side. A number of beams is connected to the second side of the number of platforms at a plurality of connection points. Each platform in the number of platforms comprises a number of devices. The plurality of connection points is configured to receive a plurality of loads applied at the plurality of connection points in response to a load on the number of platforms, and at least a portion of the plurality of connection points is configured to move in response to the load on the number of platforms, such that the orientation of the number of platforms remains substantially unchanged in response to the load on the number of platforms. The orientation for the number of platforms is changed to the selected orientation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 10 is an illustration of a bottom perspective view of a configuration for a solar collector system having two platforms in accordance with an advantageous embodiment;

FIG. 12 is an illustration of a configuration for N platforms in a solar cell collector system in accordance with an advantageous embodiment;

FIG. 22 is an illustration of loads being applied on a beam in accordance with an advantageous embodiment;

FIG. 23 is an illustration of loads being applied on a beam in accordance with an advantageous embodiment;

FIG. 24 is an illustration of loads being applied on a beam in accordance with an advantageous embodiment.

DETAILED DESCRIPTION

Figure 1:
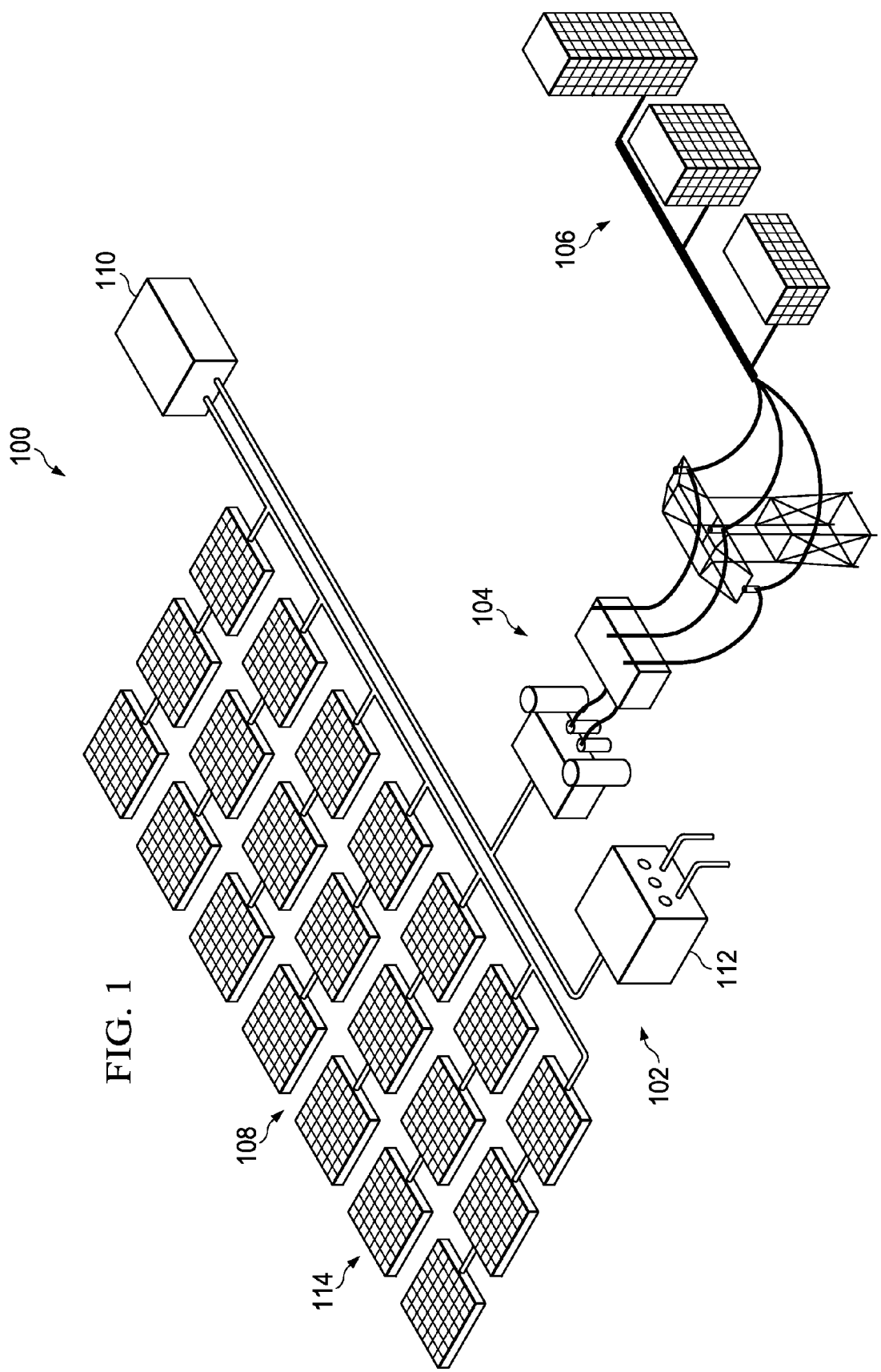
FIG. 1 is an illustration of a solar power environment in accordance with an advantageous embodiment.

The different advantageous embodiments recognize and take into account a number of different considerations. A number, as used herein with reference to items, means one or more items. For example, "a number of considerations" is one or more considerations.

The different advantageous embodiments recognize and take into account that the tolerance in pointing collectors may be critical in providing a desired concentration ratio of the sunlight on solar cells in the collectors. For example, with a concentration ratio at about 700, the tolerance in pointing a collector may be less than about 0.5 degrees. As the concentration ratio increases, the different advantageous embodiments recognize that the amount of deviation from pointing directly towards the sun may decrease. This angle also may be referred to as an acceptance angle.

The different advantageous embodiments recognize and take into account that the structures may be designed to support the collectors. These structures may also be referred to as frames or solar collector frames.

The different advantageous embodiments recognize and take into account that these frames may be designed to maintain a desired level of accuracy in pointing the collectors to obtain a desired level of concentration. Further, the different advantageous embodiments also recognize and take into account that the frames may be designed to take into account loads caused by gravity and wind.

The different advantageous embodiments recognize and take into account that these frames may have a desired level of stiffness. For a particular frame design, the different advantageous embodiments recognize and take into account that increasing the stiffness may result in increased amounts of material being needed for the frame. As a result, the cost for frames may increase.

The different advantageous embodiments recognize and take into account that it would be desirable to have a frame that has a design that does not require an increased amount of material.

The different advantageous embodiments recognize that a frame for a collector may encounter loads from gravity, wind, and/or other sources. As a result, the frame may deflect. Deflection is a change in the shape of the frame. As a result, components of the frame that may be theoretically straight may become curved under when a load is applied to the frame. As a result, the different advantageous embodiments recognize and take into account that these deflections may cause collectors to rotate or change from a desired orientation.

The different advantageous embodiments recognize and take into account that a tracking mechanism may be used to point the collectors at the sun. The tracking mechanism, however, may have a pointing error that changes when the frame deflects. Additionally, the different advantageous embodiments recognize and take into account that the deflection in the frame may cause errors that may be greater than desired when pointing the collectors.

Thus, the different advantageous embodiments provide a method and apparatus for maintaining a desired orientation for collectors in a solar power system. In one advantageous embodiment, an apparatus comprises a number of platforms and a number of beams. The number of platforms has a first side and a second side. The number of platforms comprises a number of devices. The number of beams is connected to the second side of the number of platforms at a plurality of connection points. The number of beams is configured to allow movement of the plurality of connection points such that an orientation of the number of platforms remains substantially unchanged in response to a load on the number of platforms.

With reference now to FIG. 1, an illustration of a solar power environment is depicted in accordance with an advantageous embodiment. In this illustrative example, a solar power environment 100 includes a solar power plant 102. The solar power plant 102 is connected to a grid 104 and provides electricity to loads 106.

As used herein, when a first component is connected to a second component, the first component may be connected to the second component without any additional components. The first component also may be connected to the second component by one or more other components. For example, a first component may be connected to a second component without any additional components or parts between the two components. In some cases, a connector, a part, and/or another structure may be present between the first component and the second component that connects the two components.

As depicted, the solar power plant 102 comprises a solar collector field 108, electrical auxiliaries 110, and a control system 112. The solar collector field 108 comprises collectors 114. The collectors 114 are configured to generate electricity from sunlight. The collectors 114, in these examples, may be concentrating solar collectors. In other words, lenses, mirrors, or a combination of the two may be configured to concentrate sunlight on solar cells in the solar collectors.

One or more of the advantageous embodiments may be implemented in the collectors 114. The different advantageous embodiments may be implemented to maintain a desired orientation of the collectors 114 even in response to loads that may be applied to the collectors 114. These loads may be caused by gravity, wind, and/or other suitable types of loads. Further, the different advantageous embodiments may be implemented in a manner that reduces the weight of the collectors 114.

The electrical auxiliaries 110 connect the collectors 114 to the grid 104 in these illustrative examples. The electrical auxiliaries 110 provide resources for generating electricity using the collectors 114. For example, the electrical auxiliaries 110 may include uninterruptable power supply (UPS) systems, power conditioning, distribution, cooling, backup generators, and other suitable types of services.

The control system 112 controls the generation and collection of electricity by the collectors 114 and the electrical auxiliaries 110. The control system 112 also may monitor the generation of electricity by the collectors 114.

Figure 2:
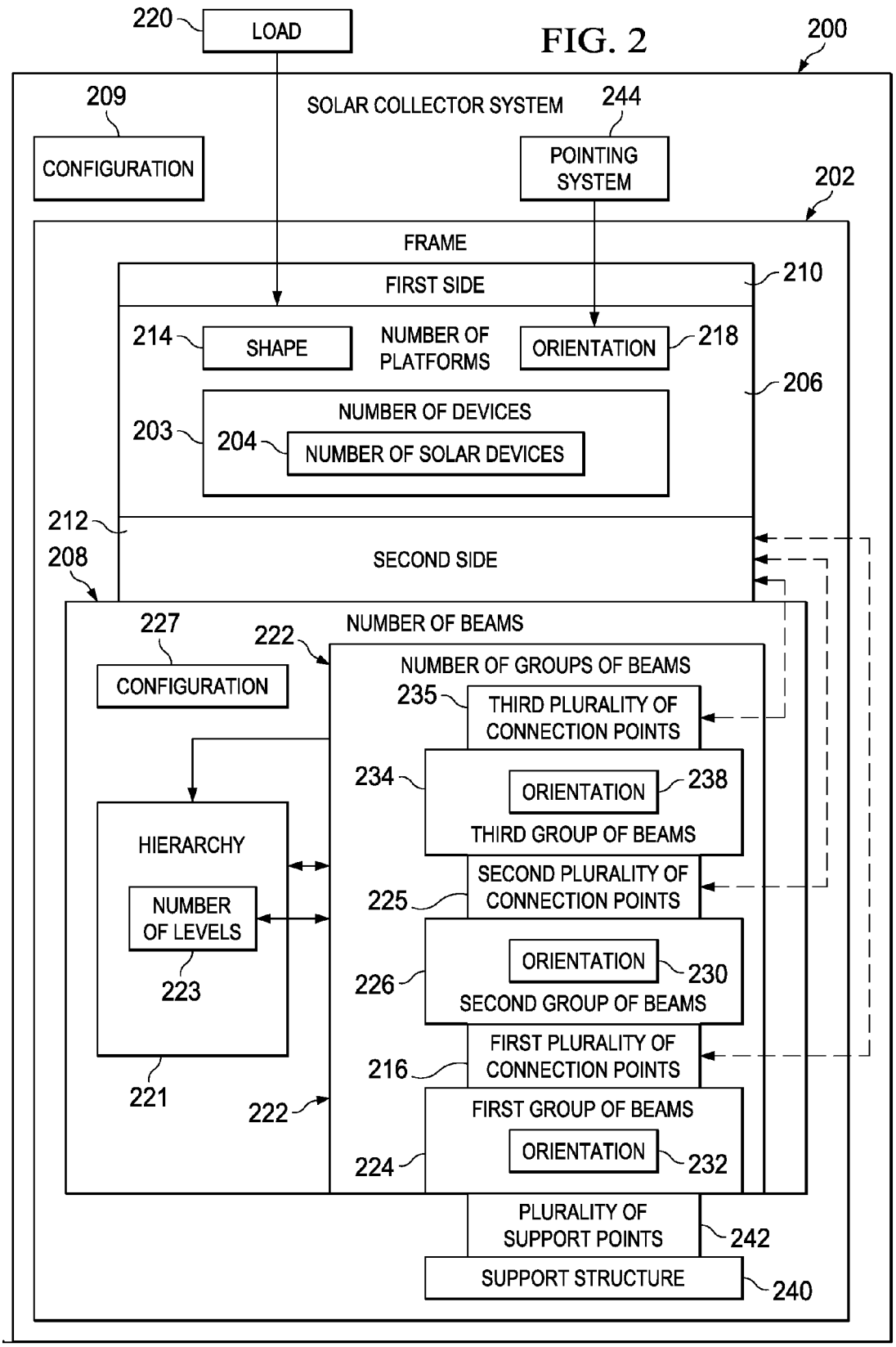
FIG. 2 is an illustration of a solar collector system in accordance with an advantageous embodiment.

With reference now to FIG. 2, an illustration of a solar collector system is depicted in accordance with an advantageous embodiment. A solar collector system 200 is an example of a structure for supporting and pointing the collectors 114 in FIG. 1.

As illustrated, the solar collector system 200 may comprise a frame 202 and a number of solar devices 204. The frame 202 comprises a number of platforms 206 and a number of beams 208. Any number of platforms, any number of beams, and/or any number of other components may be used to form a configuration 209 for the solar collector system 200. Illustrative and non-limiting examples of different types of configurations for the configuration 209 for the frame 202 are presented and described in later figures.

In these depicted examples, each of the number of platforms 206 comprises a number of devices 203. For example, without limitation, the number of devices 203 may be connected to each other to form the number of platforms 206.

In these illustrative examples, the number of devices 203 takes the form of the number of solar devices 204. When the number of devices 203 is the number of solar devices 204, the number of platforms 206 may be referred to as a number of collectors.

A solar device, in these illustrative examples, may be any device that converts sunlight into electricity. For example, without limitation, the number of solar devices 204 may be a number of solar cells. In other illustrative examples, the number of solar devices 204 may be any object having a reflective surface configured to direct solar radiation towards a solar power collection system. For example, the number of solar devices 204 may be a number of mirrors, a number of heliostat mirrors, a reflective film, and/or some other suitable type of solar device.

In these illustrative examples, the number of platforms 206 has a first side 210 and a second side 212. The second side 212 is opposite to the first side 210. When the number of solar devices 204 is a number of mirrors or a reflective film, for example, the first side 210 may be the reflective surface for the number of mirrors and/or reflective film.

Additionally, the number of platforms 206 has a shape 214. The shape 214 may be, for example, without limitation, curved, substantially planar, rectangular, square, circular, and/or some other suitable shape. Further, each solar device in a particular platform may have a shape that is substantially planar, curved, and/or some other suitable shape. The number of beams 208 is connected to the second side 212 of the number of platforms 206 at connection points.

In these illustrative examples, each beam in the number of beams 208 is a structural member. For example, without limitation, each beam in the number of beams 208 may be a rod, a tube, an elongate structural member, an elongate plate, an I-shaped member, an angled section, and/or some other suitable type of structural member.

The number of beams 208 is configured to allow a load 220 on the number of platforms 206 to be transferred from the number of platforms 206 to the number of beams 208. In particular, the load 220 is transferred from the number of platforms 206 to the number of beams 208 such that an orientation 218 of each of the number of platforms 206 remains substantially unchanged in response to the load 220 on the number of platforms 206. In these illustrative examples, the load 220 may take a number of different forms. For example, the load 220 may be caused by gravity, wind, and/or other suitable sources.

Further, in these illustrative examples, the load 220 is a substantially constant load that is substantially normal to the number of platforms 206. The load 220 may be a substantially uniformly distributed load with each point on the number of platforms 206 receiving substantially the same amount of load at substantially the same point in time. In the illustrative examples, the same amount of load may also be received for substantially the same amount of time. In some illustrative examples, the load 220 is the portion of loading on the number of platforms 206 that is substantially uniformly distributed.

Additionally, in these depicted examples, the solar collector system 200 includes a support structure 240. The support structure 240 provides support for the number of beams 208 and the load 220 that is transferred to the support structure 240. The load 220 is transferred from the number of beams 208 to the support structure 240. The load 220 that is transferred to the support structure 240 includes the load 220 on the number of platforms 206, as well as any loading from the weight of the number of platforms 206 and the number of beams 208.

As illustrated, the support structure 240 is connected to at least a portion of the number of beams 208 at a plurality of support points 242. In the different illustrative examples, "at least a portion" of the number of beams 208 means some or all of the number of beams 208.

In the depicted examples, the number of beams 208 may comprise a number of groups of beams 222. A group of beams is one or more beams. Each group of beams in the number of groups of beams 222 may be connected to other beams in other groups in the number of groups of beams 222. As one illustrative example, beams may be connected such that one group of beams has an orientation that is substantially perpendicular to another group of beams.

A configuration 227 for the number of beams 208 includes the manner in which the beams in the number of beams 208 are arranged relative to each other and connected to each other and the number of platforms 206. In these illustrative examples, the number of groups of beams 222 having the configuration 227 forms a hierarchy 221 of beams. The hierarchy 221 comprises a number of levels 223. Each group in the number of groups of beams 222 forms a level in the number of levels 223 in the hierarchy 221.

The lowest level of hierarchy in the number of levels 223 is formed by the group of beams that is connected to the support structure 240. The highest level of hierarchy in the number of levels 223 of the hierarchy 221 is formed by the group of beams that is connected to the number of platforms 206.

In one illustrative example, the number of groups of beams 222 includes a first group of beams 224. When the first group of beams 224 is the only group of beams, the support structure 240 is connected to the first group of beams 224 at the plurality of support points 242. In one illustrative example, each beam in the first group of beams 224 is connected to the support structure 240 at two support points.

Additionally, the first group of beams 224 is connected to the number of platforms 206 at the first plurality of connection points 216. The load 220 on the number of platforms 206 is transferred to the first group of beams 224 at the first plurality of connection points 216. In other words, the first plurality of connection points 216 is configured to receive the load 220 as a plurality of loads are applied at the first plurality of connection points 216 in response to the load 220 on the number of platforms 206. Further, at least a portion of the first plurality of connection points 216 is configured to move in response to the load 220 on the number of platforms 206. In this manner, the first plurality of connection points 216 functions as support points for the number of platforms 206.

Further, when the first group of beams 224 is the only group of beams, the load 220 that is transferred from the number of platforms 206 to the first group of beams 224 is transferred to the support structure 240 through the plurality of support points 242 connecting the support structure 240 to the first group of beams 224.

As another illustrative example, the number of groups of beams 222 may include the first group of beams 224 and a second group of beams 226. The first group of beams 224 forms a first level in the number of levels 223 in the hierarchy 221. The second group of beams 226 forms a second level in the number of levels 223 in the hierarchy 221.

The first group of beams 224 is connected to the support structure 240 at the plurality of support points 242. Additionally, the first group of beams 224 is connected to the second group of beams 226 at the first plurality of connection points 216.

In this illustrative example, the second group of beams 226 is connected to the number of platforms 206 at a second plurality of connection points 225. In this manner, the first group of beams 224 is connected to the number of platforms 206 through the second group of beams 226.

In this illustrative example, the second group of beams 226 is connected to the first group of beams 224 such that the second group of beams 226 has an orientation 230 that is substantially perpendicular to an orientation 232 of the first group of beams 224.

In some illustrative examples, the second group of beams 226 may be connected to the first group of beams 224 such that the two groups are stacked relative to each other. For example, the second group of beams 226 may be stacked relative to the first group of beams 224 in a "log cabin" style. In other illustrative examples, the second group of beams 226 may be interwoven with the first group of beams 224.

The load 220 on the number of platforms 206 is transferred to the second group of beams 226 at the second plurality of connection points 225. In other words, the second plurality of connection points 225 receives the load 220 on the number of platforms 206 as a plurality of loads applied at the second plurality of connection points 225 in response to the load 220 on the number of platforms 206. Further, the second plurality of connection points 225 is configured to move in response to the load 220 on the number of platforms 206. In this manner, the second plurality of connection points 225 functions as support points for the number of platforms 206.

The load 220 transferred to the second group of beams 226 is supported by the first group of beams 224 at the first plurality of connection points 216. In this manner, the first plurality of connection points 216 functions as support points for the second group of beams 226.

Further, the load 220 on the second group of beams 226 is transferred to the first group of beams 224 at the first plurality of connection points 216. The load 220 transferred to the first group of beams 224 is transferred to and supported by the support structure 240 at the plurality of support points 242.

In this illustrative example, the positions of the first plurality of connection points 216, the second plurality of connection points 225, and the plurality of support points 242 are selected to allow movement of these connection points and support points such that the orientation 218 of each of the number of platforms 206 remains substantially unchanged in response to the load 220 on the number of platforms 206 when that load 220 is a substantially uniformly distributed load.

In particular, the movement of the first plurality of connection points 216, the second plurality of connection points 225, and the plurality of support points 242 may be in the direction of an axis that is substantially perpendicular to the number of platforms 206.

As yet another example, the number of groups of beams 222 may include a third group of beams 234 in addition to the first group of beams 224 and the second group of beams 226. The third group of beams 234 forms a third level in the number of levels 223 in the hierarchy 221. The third group of beams 234 has an orientation 238 that is substantially perpendicular to the orientation 230 of the second group of beams 226.

The third group of beams 234 is connected to the second group of beams 226 at the second plurality of connection points 225. The number of platforms 206 is connected to the third group of beams 234 at a third plurality of connection points 235 instead of being connected to the second group of beams 226.

The load 220 on the number of platforms 206 is transferred to the third group of beams 234 at a third plurality of connection points 235. The load 220 transferred to the third group of beams 234 is supported by the second group of beams 226 at the second plurality of connection points 225. In other words, the second plurality of connection points 225 functions as support points for the third group of beams 234.

Further, the load 220 on the third group of beams 234 is transferred to the second group of beams 226 at the second plurality of connection points 225. The load 220 is then transferred to the first group of beams 224 and the support structure 240 in a manner similar to the manner described above.

In this illustrative example, the positions of the first plurality of connection points 216, the second plurality of connection points 225, the third plurality of connection points 235, and the plurality of support points 242 are selected to allow movement of these connection points and support points such that the orientation 218 of each of the number of platforms 206 remains substantially unchanged in response to the load 220 on the number of platforms 206.

In this manner, the number of levels 223 in hierarchy 221 may comprise any number of levels of beams. For example, the number of levels 223 may include two, three, four, six, eight, 10, or some other suitable number of levels. Further, each level in the number of levels 223 may include any number of beams, depending on the configuration 227 desired for the number of beams 208.

Additionally, as depicted, the solar collector system 200 may comprise a pointing system 244. The pointing system 244 is configured to change the orientation of the solar collector system 200. In particular, the pointing system 244 is configured to change the orientation of the number of platforms 206 to, for example, a selected orientation for the number of platforms 206. As one illustrative example, the selected orientation may be selected to allow the number of solar devices 204 held by the number of platforms 206 to convert solar radiation into electricity with a desired efficiency.

In these illustrative examples, the number of platforms 206 and the number of beams 208 may be comprised of a number of materials. For example, without limitation, the number of platforms 206 may be comprised of metal, plastic, glass, polymer, and/or some other suitable type of material.

Further, the number of beams 208 may be comprised of materials, such as, for example, without limitation, metal, plastic, composite materials, aluminum, steel, titanium, fiberglass, and/or some other suitable type of materials. In some illustrative examples, the number of beams 208 may all be comprised of the same material. In other illustrative examples, the different groups of beams in the number of groups of beams 222 may be comprised of different materials. For example, when two groups of beams are present, the first group of beams 224 may be comprised of steel and/or aluminum, and the second group of beams 226 may be comprised of a more flexible material, such as, for example, plastic.

Additionally, the number of beams 208 may be connected to each other, the number of platforms 206, and the support structure 240 in a number of different ways. As one illustrative example, a beam in the number of beams 208 may be connected to another beam in the number of beams 208 using angled members bolted to one or both beams. As another example, two beams may be connected to each other by being welded together at one or more connection points. Of course, other types of connections between the number of beams 208, the number of platforms 206, and the support structure 240 may be possible.

The illustration of the solar collector system 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, additional groups of beams in addition to the first group of beams 224, the second group of beams 226, and the third group of beams 234 may be present in the number of groups of beams 222. Further, in other illustrative examples, alternating groups of beams may be selected to be substantially parallel to each other, substantially perpendicular to each other, and/or at some other suitable angle to each other, depending on the implementation.

In some illustrative examples, the number of platforms 206 may be connected to the number of devices 203. For example, a solar device may be connected to a platform without any additional components or parts between the solar device and the platform. In some cases, a connector, a part, and/or another structure may be present between the solar device and the platform that connects the solar device to the platform. In this particular example, the connection is a physical connection of the solar device and the platform.

In other illustrative examples, the number of devices 203 may include devices other than solar devices. For example, without limitation, the number of devices 203 may include at least one of a microphone, a radio telescope element, a piece of glass, a support pad, and/or some other suitable type of device.

Figure 3:
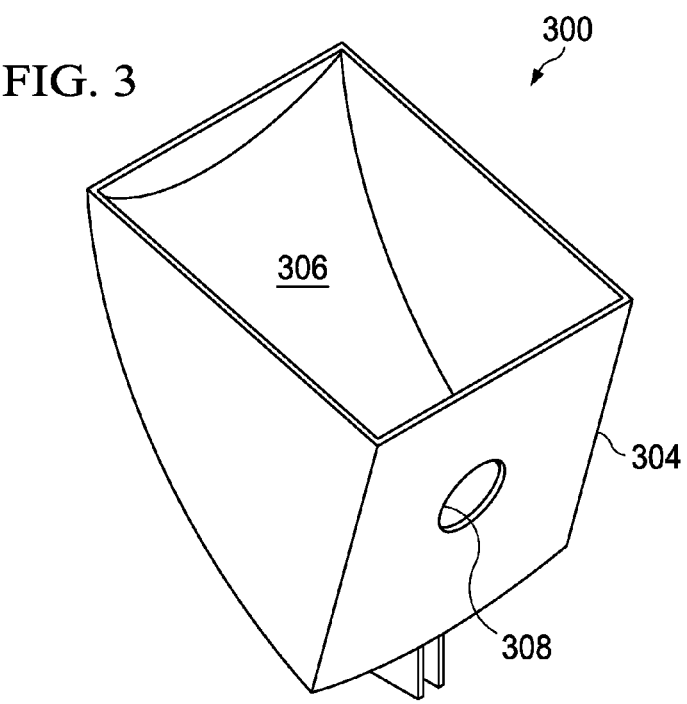
FIG. 3 is an illustration of a top perspective view of a platform in accordance with an advantageous embodiment.

With reference now to FIG. 3, an illustration of a top perspective view of a platform is depicted in accordance with an advantageous embodiment. In this illustrative example, a platform 300 is an example of one implementation for a platform in the number of platforms 206 in FIG. 2. In this particular example, the platform 300 comprises a solar device. The solar device is an example of one implementation for a solar device in the number of solar devices 204 in FIG. 2.

As depicted, the solar device is a concentrating photovoltaic module in this depicted example. The solar device comprises a housing 304 and a reflective surface 306. The reflective surface 306 is a mirror surface is this illustrative example. The reflective surface 306 is configured to direct solar radiation through an opening 308 towards, for example, without limitation, at least one solar cell.

In this illustrative example, the platform 300 comprises one solar device. However, in other illustrative examples, two or more of this type of solar device may be connected to each other to form a platform or collector.

Figure 4:
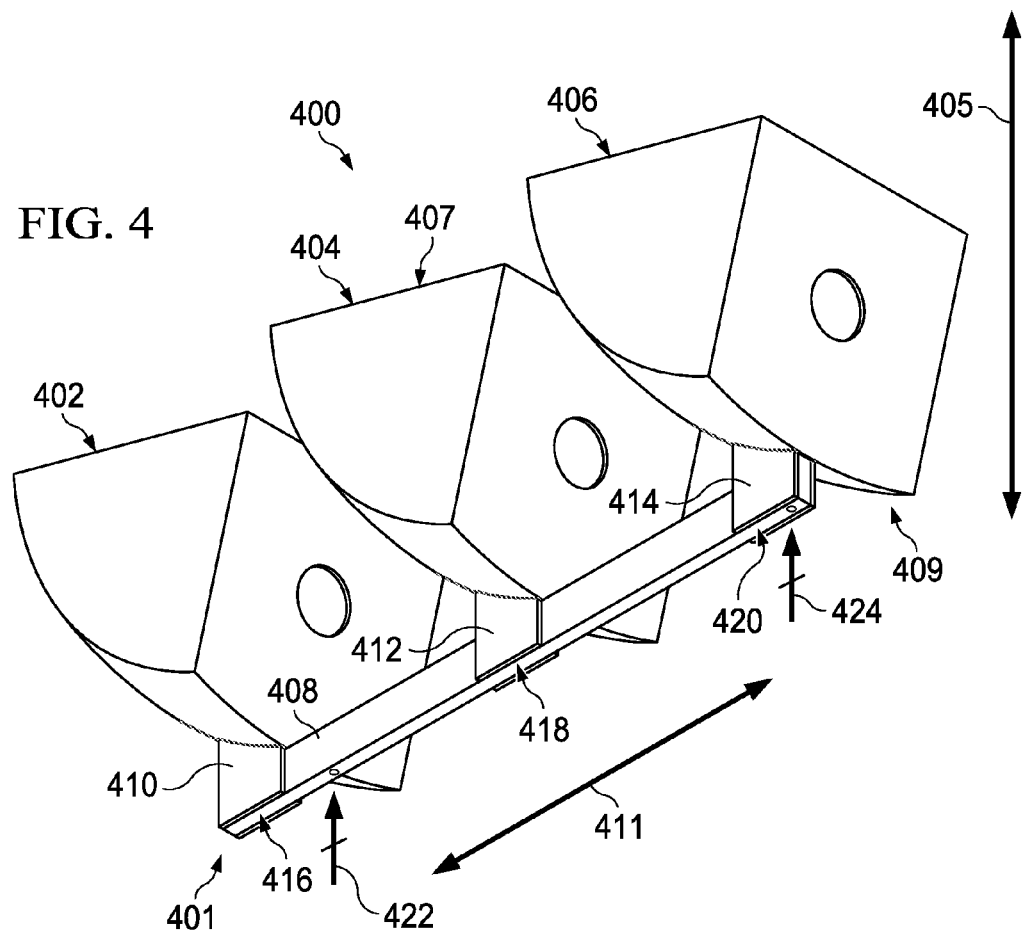
FIG. 4 is an illustration of a bottom perspective view of a configuration having three platforms in a solar collector system in accordance with an advantageous embodiment.

With reference now to FIG. 4, an illustration of a bottom perspective view of a configuration having three platforms in a solar collector system is depicted in accordance with an advantageous embodiment. In this illustrative example, a first configuration 400 for a solar collector system 401 is an example of one implementation for the configuration 209 for the solar collector system 200 in FIG. 2.

The first configuration 400 for the solar collector system 401 includes three platforms arranged in a row, one beam connected to the platforms, and three load points on the beam. A load point is a point on a beam onto which a load may be applied or transferred. The load point may also be referred to as a load application point.

As depicted, the solar collector system 401 includes platforms 402, 404, and 406. These platforms may be implemented using, for example, the platform 300 in FIG. 3. In this illustrative example, the platforms 402, 404, and 406 are concentrating photovoltaic modules. The platforms 402, 404, and 406 each have a substantially same orientation in this depicted example. In particular, the platforms 402, 404, and 406 are arranged in a row substantially perpendicular to an axis 405. The platforms 402, 404, and 406 have a first side 407 and a second side 409.

In the first configuration 400, the platforms 402, 404, and 406 are connected to each other by a beam 408. The beam 408 forms one level of hierarchy for beams. As depicted, the platforms 402, 404, and 406 are connected to the beam 408 by members 410, 412, and 414, respectively. In particular, the beam 408 is connected to the second side 409 of the platforms 402, 404, and 406 by the members 410, 412, and 414, respectively.

As illustrated, the platform 402 is connected to the beam 408 by the member 410 at a connection point 416. The platform 404 is connected to the beam 408 by the member 412 at a connection point 418. The platform 406 is connected to the beam 408 by the member 414 at a connection point 420.

The connection points 416, 418, and 420 are the points at which a load may be applied or transferred to the beam 408 in response to a load being applied to the platforms 402, 404, and 406. In other words, the connection points 416, 418, and 420 are the load points for the beam 408. Additionally, a support structure (not shown), such as the support structure 240 in FIG. 2, may be connected to the beam 408 at a support point 422 and a support point 424. The load transferred to the beam 408 may be transferred to the support structure (not shown) at support point 422 and the support point 424.

In this illustrative example, the positions of the connection points 416, 418, and 420 and the support points 422 and 424 on the beam 408 relative to an axis 411 are selected to allow movement of the connection points 416, 418, and 420 such that the orientation of the platforms 402, 404, and 406 remains substantially unchanged in response to a load on the platforms.

Further, the connection points 416, 418, and 420 and the support points 422 and 424 in the first configuration 400 allow moments to be transferred such that rotation of the platforms 402, 404, and 406 about the axis 405, the axis 411, and/or an axis (not shown in this view) that is substantially perpendicular to both the axis 405 and the axis 411 is substantially absent.

Figure 5:
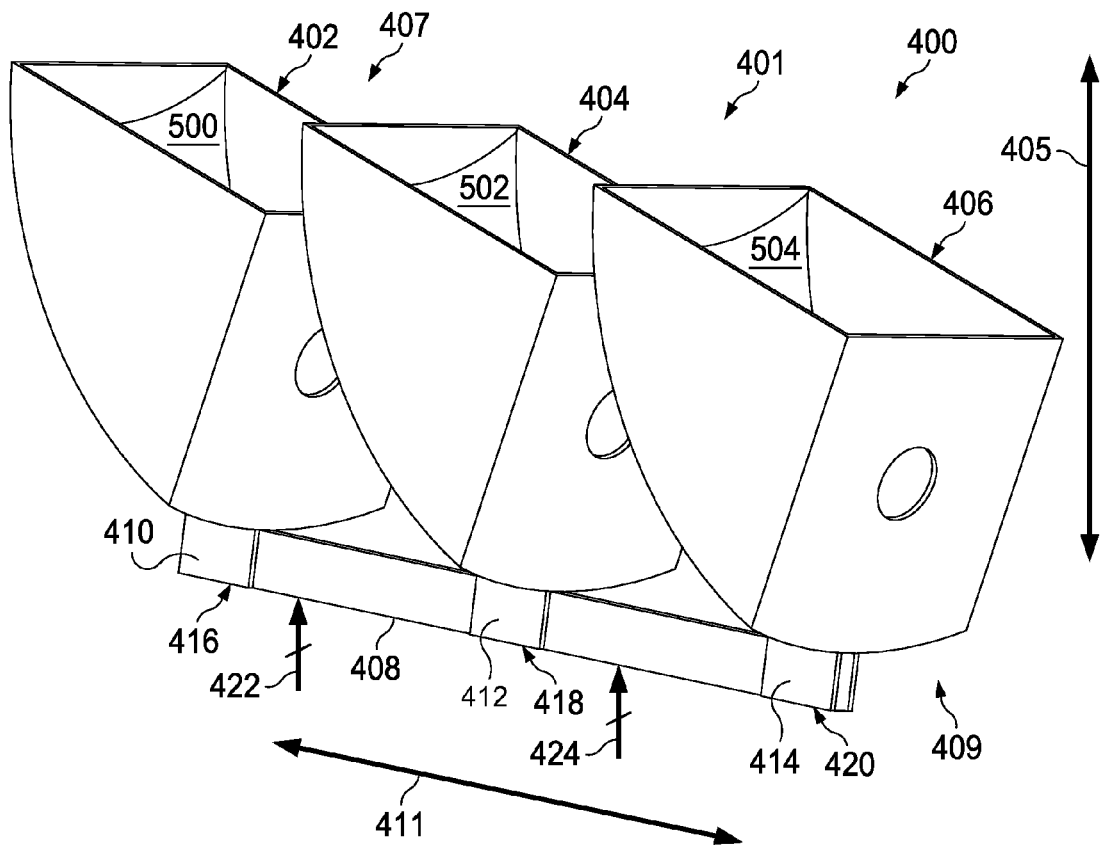
FIG. 5 is an illustration of a top perspective view of a configuration for three platforms in a solar collector system in accordance with an advantageous embodiment.

With reference now to FIG. 5, an illustration of a top perspective view of a configuration for three platforms in a solar collector system is depicted in accordance with an advantageous embodiment. As depicted, the platforms 402, 404, and 406 from FIG. 4 have mirror surfaces 500, 502, and 504, respectively. These mirror surfaces may be seen from a top perspective view of the first side 407 for the platforms 402, 404, and 406.

Figure 6:
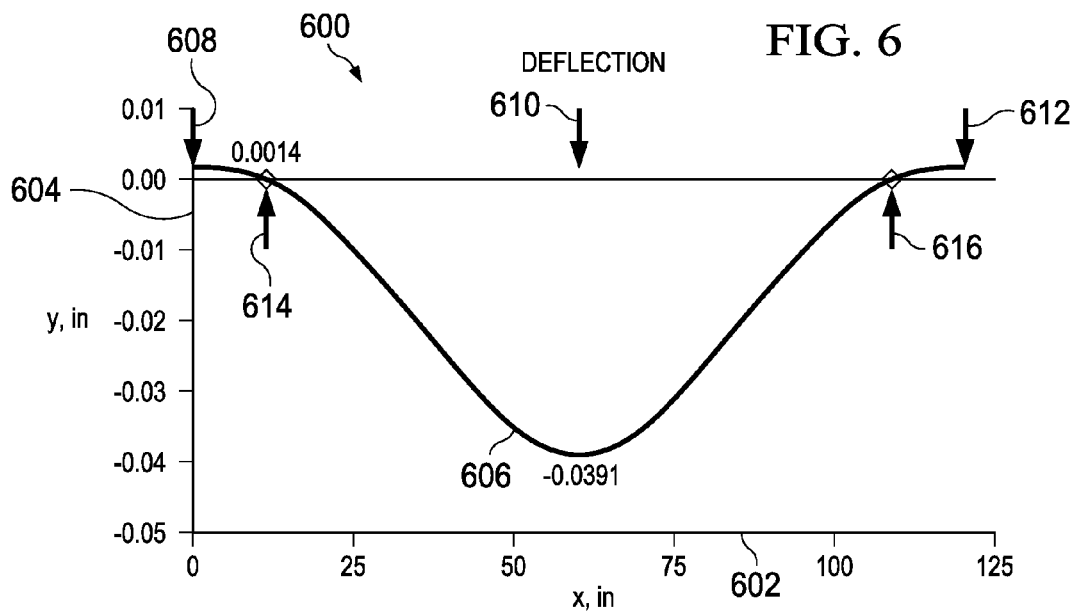
FIG. 6 is an illustration of a graph of the deflection of a beam for a solar collector system in response to a load in accordance with an advantageous embodiment.

Turning now to FIG. 6, an illustration of a graph of the deflection of a beam for a solar collector system in response to a load is depicted in accordance with an advantageous embodiment. In this illustrative example, graph 600 is a graph of the deflection of the beam 408 for the solar collector system 401 in FIG. 4 in response to a load on the platforms 402, 404, and 406 in FIG. 4 being transferred to the beam 408. The load on the platforms is applied to the beam 408 as three substantially equal loads at the connection points 416, 418, and 420 in FIG. 4. The graph 600 includes a horizontal axis 602 and a vertical axis 604.

The horizontal axis 602 is a position with respect to the axis 411 in FIG. 4 in inches. The vertical axis 604 is an amount of deflection with respect to the axis 405 in FIG. 4 in inches. The amount of deflection is the amount of deflection for the beam 408 in response to a substantially uniformly distributed load on the platforms 402, 404, and 406 being transferred to the beam 408. A curve 606 is the amount of deflection for the beam 408 with respect to the axis 405 in FIG. 4.

In this illustrative example, arrows 608, 610, and 612 indicate the positions of the connection points 416, 418, and 420, respectively, with respect to the axis 411 in FIG. 4. In other words, the arrows 608, 610, and 612 indicate the load points for the beam 408. Further, an arrow 614 and an arrow 616 indicate the positions of the support points 422 and 424 in FIG. 5 at which a support structure may be connected to the beam 408 in FIG. 4.

As depicted, the curve 606 has a substantially zero slope in the horizontal direction at the points corresponding to the arrows 608, 610, and 612. This substantially zero slope indicates that the orientation for each of the platforms 402, 404, and 406 in FIG. 4 remains substantially unchanged in response to a load on the platforms even with deflection of the connection points 416, 418, and 420 in the direction of the axis 405. Further, the curve 606 indicates that deflection does not occur at the support points 422 and 424.

Figure 7:
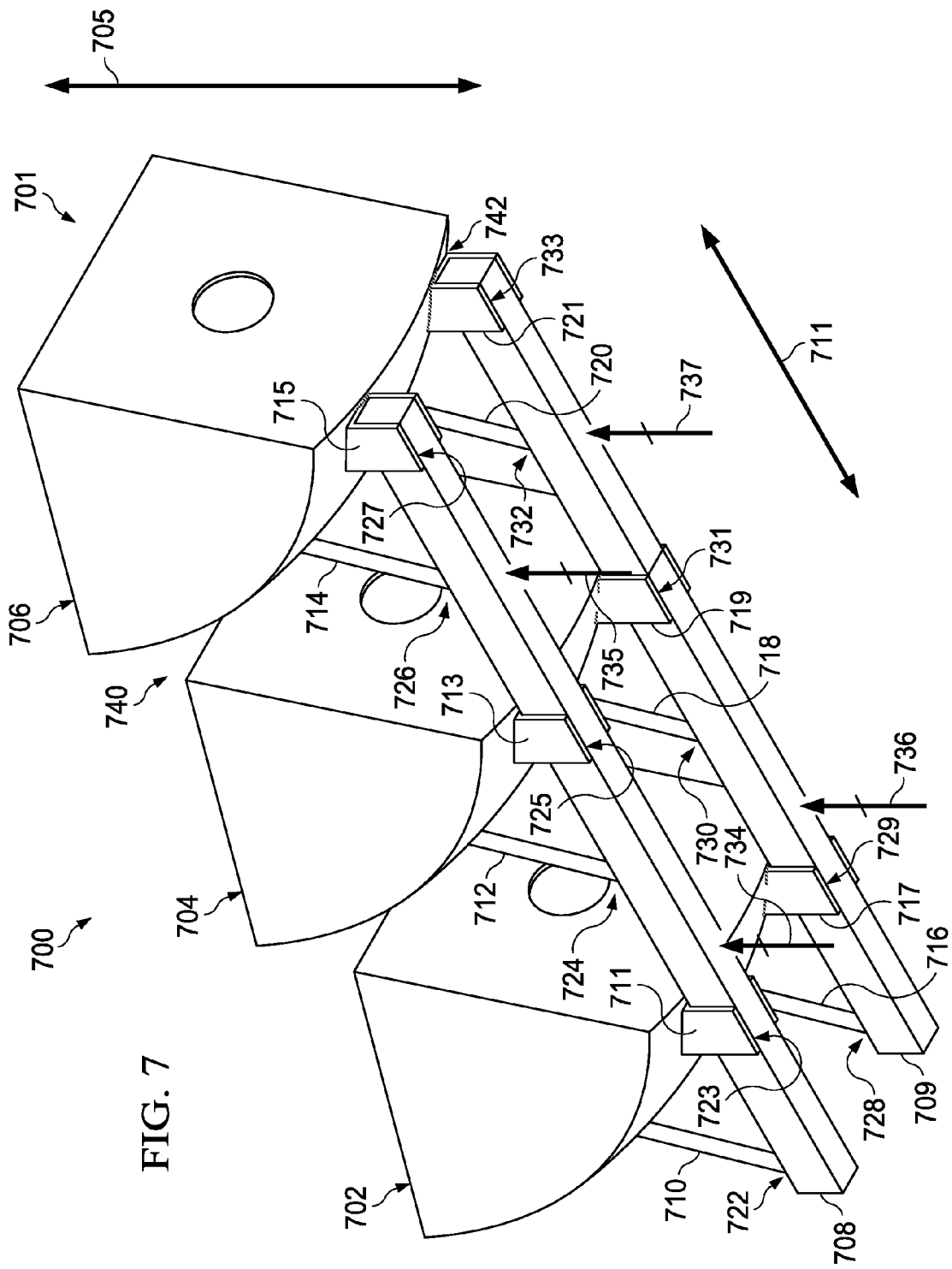
FIG. 7 is an illustration of a bottom perspective view of a configuration of three platforms in a solar collector system in accordance with an advantageous embodiment.

With reference now to FIG. 7, an illustration of a bottom perspective view of a configuration of three platforms in a solar collector system is depicted in accordance with an advantageous embodiment. In this illustrative example, a second configuration 700 for a solar collector system 701 is an example of one configuration for the solar collector system 200 in FIG. 2.

The second configuration 700 for the solar collector system 701 includes three platforms arranged in a row, two beams connected to the platforms, and six load points per beam. As depicted, the solar collector system 701 includes platforms 702, 704, and 706. These platforms may be implemented using, for example, the platform 300 in FIG. 3.

The platforms 702, 704, and 706 each have a substantially same orientation. In particular, the platforms 702, 704, and 706 are arranged substantially perpendicular to an axis 705.

The platforms 702, 704, and 706 have a first side 740 and a second side 742. As depicted, the first side 740 faces away from the reader in this view. The first side 740 is the side configured to receive solar radiation. In particular, the first side 740 of the platforms 702, 704, and 706 is the side with reflective surfaces (not shown) for the platforms, such as the reflective surface 306 in FIG. 3.

Further, as depicted, the second side of the platforms 702, 704, and 706 is closest to the reader in this view. The second side of the platforms 702, 704, and 706 is the side that is connected to a first beam 708 and a second beam 709.

In the second configuration 700, the platforms 702, 704, and 706 are connected to each other by the first beam 708 and the second beam 709 connected to second side 742 of the platforms 702, 704, and 706. The first beam 708 and the second beam 709 form one level of hierarchy. As illustrated, the platforms 702, 704, and 706 are connected to the first beam 708 by members 710, 711, 712, 713, 714, and 715, respectively, and to the second beam 709 by members 716, 717, 718, 719, 720, and 721, respectively.

In particular, the members 710, 711, 712, 713, 714, and 715 are connected to the first beam 708 at connection points 722, 723, 724, 725, 726, and 727, respectively. The members 716, 717, 718, 719, 720, and 721 are connected to the second beam 709 at connection points 728, 729, 730, 731, 732, and 733, respectively.

The connection points 722-727 for the first beam 708 are the points at which a load may be transferred from the platforms 702, 704, and 706 onto the first beam 708. The connection points 728-733 for the second beam 709 are the points at which a load may be transferred from the platforms 702, 704, and 706 onto the second beam 709. In other words, the different connection points 722-733 are the load points for the first beam 708 and the second beam 709. In this manner, the first beam 708 and the second beam 709 each have six load points.

Further, in this illustrative example, a support structure (not shown), such as the support structure 240 in FIG. 2, may be connected to the first beam 708 and the second beam 709 at support points 734, 735, 736, and 737. The load transferred to the first beam 708 and the second beam 709 is transferred to the support structure through the support points 734-737.

In this illustrative example, the position of the connection points 722-733 and the support points 734-737, relative to an axis 711 may be selected to allow deflection of the connection points 722-733 such that the orientation of the platforms 702, 704, and 706 remains substantially unchanged in response to a substantially uniformly distributed load on the platforms 702, 704, and 706.

In these illustrative examples, the substantially uniformly distributed load on the platforms 702, 704, and 706 is transferred to the first beam 708 and the second beam 709 as six substantially equal loads on each beam. The connection points 722-733 move in response to the substantially equal loads applied to the beams. In particular, the connection points 722-733 move vertically in the direction of the axis 705.

Deflection of the two beams causes all three of the platforms, 702, 704, and 706, to move in a substantially same direction along the axis 705. Two of the platforms, the platform 702 and the platform 706, move in substantially equal amounts, while one of the platforms, the platform 704, moves in the same direction, but by a greater amount, along the axis 705. The orientation of each of the platforms 702, 704, and 706 remains substantially unchanged in response to the load.

Figure 8:
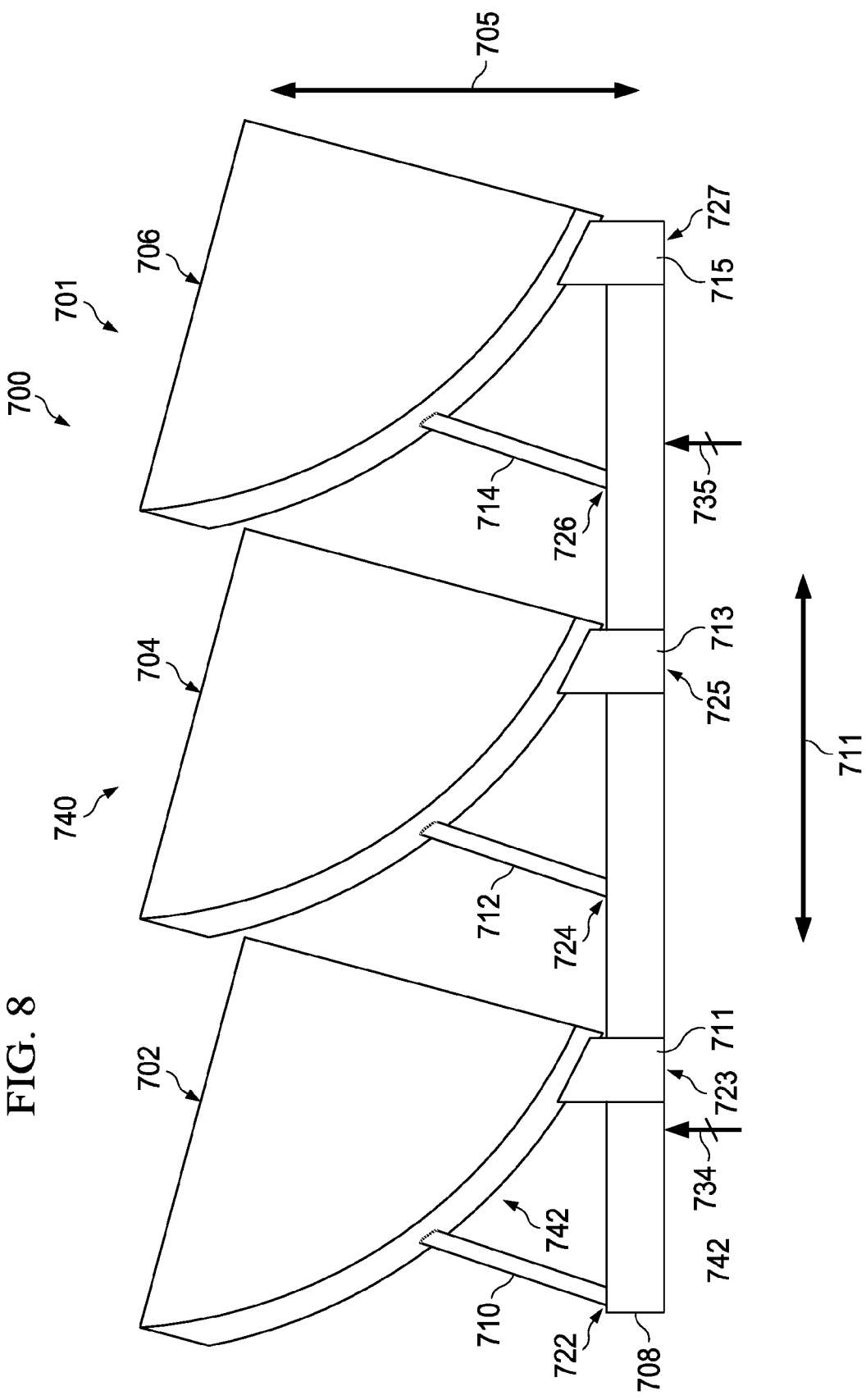
FIG. 8 is an illustration of a side view of a configuration for three platforms in a solar collector system in accordance with an advantageous embodiment.

With reference now to FIG. 8, an illustration of a side view of a configuration for three platforms in a solar collector system is depicted in accordance with an advantageous embodiment. In this illustrative example, a side view for the second configuration 700 for the solar collector system 701 in FIG. 7 is depicted from a side view of the first beam 708 in FIG. 7.

Figure 9:
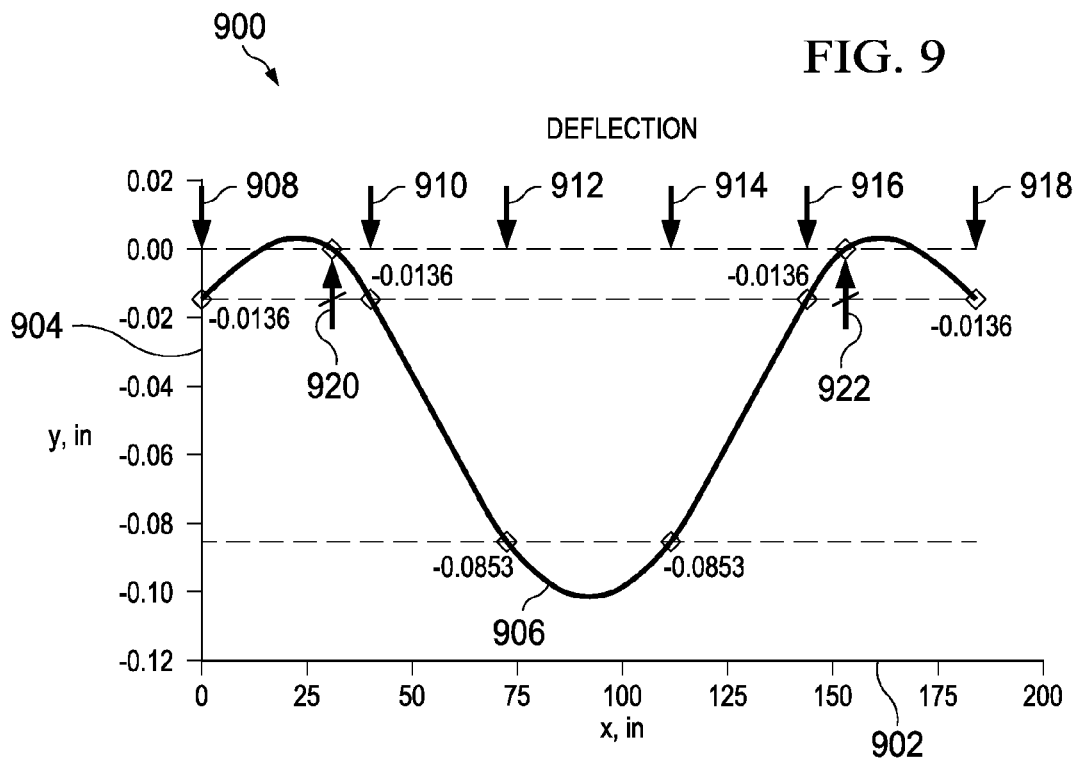
FIG. 9 is an illustration of a graph of deflection of a beam in response to a load in accordance with an advantageous embodiment.

Turning now to FIG. 9, an illustration of a graph of deflection of a beam in response to a load is depicted in accordance with an advantageous embodiment. In this illustrative example, a graph 900 is the deflection of the first beam 708 in FIG. 7 in response to a load on the platforms 702, 704, and 706 being transferred to the first beam 708. The load on the platforms is applied to the first beam 708 as six substantially equal loads at the connection points 722-727.

As depicted, the graph 900 includes a horizontal axis 902 and a vertical axis 904. The horizontal axis 902 is a position with respect to the axis 711 in FIG. 7 in inches. The vertical axis 904 is an amount of deflection for the beam 708 with respect to the axis 705 in FIG. 7 in inches. The amount of deflection is the amount of deflection for the beam 708 in response to a substantially uniformly distributed load on the platforms 702, 704, and 706.

Curve 906 is the amount of deflection for the beam 708 with respect to the axis 705 in FIG. 7. The curve for the amount of deflection for the second beam 709 in FIG. 7 may be substantially the same as the curve 906 for the first beam 708.

In this illustrative example, arrows 908, 910, 912, 914, 916, 918, 920, and 922 indicate positions with respect to the axis 711 in FIG. 7. As illustrated, the arrow 908 and the arrow 910 indicate the positions of the connection point 722 and the connection point 723, respectively, which connect the first beam 708 with the platform 702 in FIG. 7. The arrow 912 and the arrow 914 indicate the positions of the connection point 724 and the connection point 725, respectively, which connect the first beam 708 with the platform 704 in FIG. 7.

The arrow 916 and the arrow 918 indicate the positions of the connection point 726 and the connection point 727, respectively, which connect the first beam 708 with the platform 706 in FIG. 7. Further, the arrow 920 and the arrow 922 indicate the positions of the support point 734 and the support point 735 in FIG. 7, respectively, on the first beam 708.

As depicted, the curve 906 has substantially the same value at the points on the curve 906 corresponding to the arrow 908 and the arrow 910. The curve 906 also has the same value at the points on the curve 906 corresponding to the arrow 912 and the arrow 914. The curve 906 has the same value at the points on the curve 906 corresponding to the arrow 916 and the arrow 918. Further, the curve 906 indicates that deflection does not occur at the support points 734 and 735, which correspond to arrows 920 and 922, respectively.

In this manner, the orientation for the platforms 702, 704, and 706 remains substantially unchanged in response to the substantially uniformly distributed load on the platforms.

Additionally, moments may or may not be transferred from the platforms 702, 704, and 706 to the first beam 708 and the second beam 709, depending on the implementation. In other words, rotation of the platforms 702, 704, and 706 about the axis 705, the axis 711, and an axis (not shown) substantially perpendicular to the axis 705 and the axis 711 is substantially absent when moments are transferred to the first beam 708 and the second beam 709. This rotation may be minimally present when moments are not transferred to the first beam 708 and/or the second beam 709.

With reference now to FIG. 10, an illustration of a bottom perspective view of a configuration for a solar collector system having two platforms is depicted in accordance with an advantageous embodiment. In this illustrative example, a third configuration 1000 for a solar collector system 1001 is an example of one implementation for a configuration for platforms in the solar collector system 200 in FIG. 2.

The third configuration 1000 includes two platforms arranged in a row, two beams connected to the platforms, and four load points per beam. As depicted, the solar collector system 1001 includes a first platform 1002 and a second platform 1004. The first platform 1002 and the second platform 1004 have a first side 1003 and a second side 1007.

The first platform 1002 and the second platform 1004 are connected to a first beam 1006 and a second beam 1008 by members 1009. In particular, the first platform 1002 and the second platform 1004 are connected to the first beam 1006 and the second beam 1008 by the members 1009 at various connection points on the second side 1007 of the first beam 1006 and the second beam 1008. The first beam 1006 and the second beam 1008 form one level of hierarchy of beams.

As illustrated, the first platform 1002 is connected to the first beam 1006 at connection points 1010 and 1012. The first platform 1002 is connected to the second beam 1008 at connection points 1014 and 1016. The second platform 1004 is connected to the first beam 1006 at connection points 1018 and 1020. The second platform 1004 is also connected to the second beam 1008 at connection points 1022 and 1024.

The connection points 1010, 1012, 1014, 1016, 1018, 1020, 1022, and 1024 have positions on the first beam 1006 and the second beam 1008 with respect to an axis 1011. These connection points are the load points for the first beam 1006 and the second beam 1008. In other words, a substantially uniformly distributed load on the first platform 1002 and the second platform 1004 is transferred to the first beam 1006 and the second beam 1008 at the connection points 1010, 1012, 1014, 1016, 1018, 1020, 1022, and 1024.

Further, a support structure, such as the support structure 240 in FIG. 2, may be connected to the first beam 1006 and the second beam 1008 at support points 1026, 1028, 1030, and 1032. The load transferred to the first beam 1006 and the second beam 1008 from the first platform 1002 and the second platform 1004 may be transferred to the support structure at the support points 1026, 1028, 1030, and 1032.

The positions of the connection points for the first platform 1002 and the second platform 1004 to the first beam 1006 and the second beam 1008, as well as the positions of the support points 1026, 1028, 1030, and 1032, are selected to allow movement of the connection points in the direction of an axis 1005 such that the orientation of the first platform 1002 and the second platform 1004 remains substantially unchanged in response to a load on the first platform 1002 and the second platform 1004.

Figure 11:
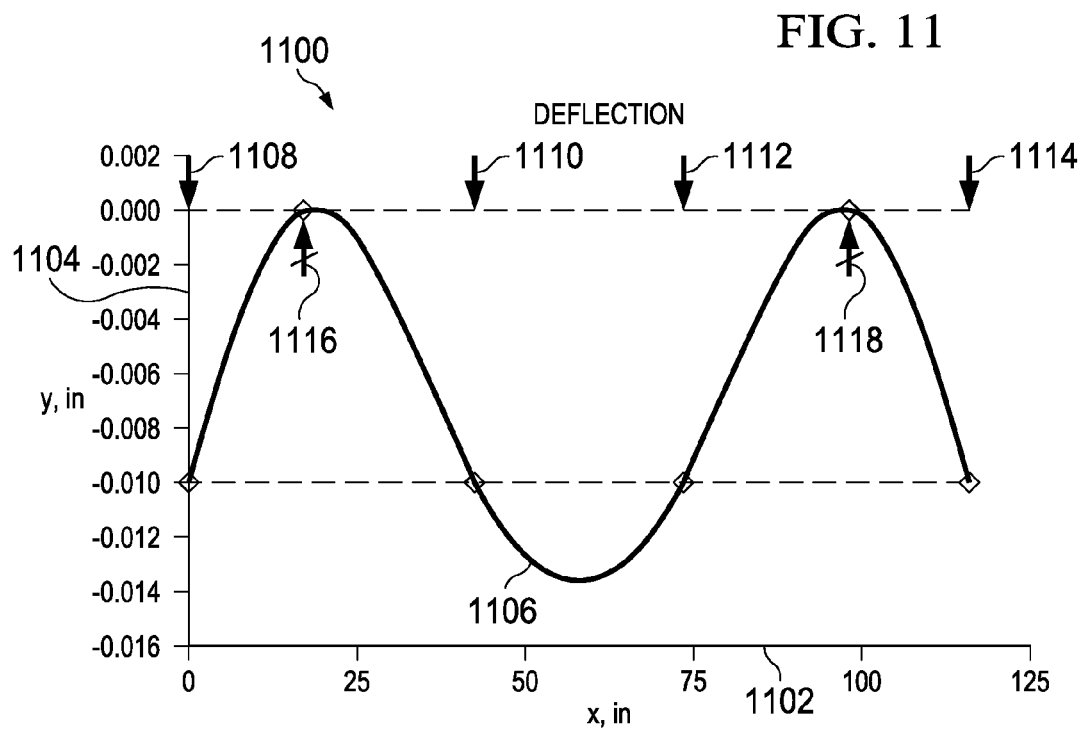
FIG. 11 is an illustration of a graph of deflection for a beam in accordance with an advantageous embodiment.

Turning now to FIG. 11, an illustration of a graph of deflection for a beam is depicted in accordance with an advantageous embodiment. In this illustrative example, a graph 1100 includes a horizontal axis 1102 and a vertical axis 1104.

The horizontal axis 1102 is a position with respect to the axis 1011 in FIG. 10 in inches. The vertical axis 1104 is an amount of deflection for the first beam 1006 with respect to the axis 1005 in FIG. 10 in inches. The deflection of the first beam 1006 occurs in response to a substantially uniformly distributed load on the first platform 1002 and the second platform 1004. In particular, the load on the first platform 1002 and the second platform 1004 is transferred to the first beam 1006 and the second beam 1008 as four substantially equal loads.

A curve 1106 is the amount of deflection for the first beam 1006 with respect to the axis 1005 in FIG. 10. The curve for the amount of deflection for the second beam 1008 in FIG. 10 may be substantially the same as the curve 1106 for the first beam 1006.

In this illustrative example, arrows 1108, 1110, 1112, and 1114 indicate the positions of the connection points 1010, 1012, 1018, and 1020, respectively, for the first beam 1006 in FIG. 10 with respect to the axis 1011. Further, arrows 1116 and 1118 indicate the positions of the support points 1026 and 1028 on the first beam 1006 at which a support structure may be connected to the first beam 1006.

As depicted, the curve 1106 has substantially the same value at the points on the curve 1106 corresponding to the arrows 1108, 1110, 1112, and 1114. In other words, each of the connection points for the first beam 1006 is deflected by a substantially same amount. In this manner, the orientation for the first platform 1002 and the second platform 1004 remains substantially unchanged in response to a substantially uniformly distributed load on the platforms. As depicted, deflection does not occur at the support points 1026 and 1028.

In this illustrative example, moments may or may not be transferred from the first platform 1002 and the second platform 1004 to the first beam 1006 and the second beam 1008, depending on the implementation. In other words, rotation of the first platform 1002 and the second platform 1004 about the axis 1005, the axis 1011, and an axis (not shown) substantially perpendicular to the axis 1005 and the axis 1011 is substantially absent when moments are transferred to the first beam 1006 and the second beam 1008. This rotation may be minimally present when moments are not transferred to the first beam 708 and/or the second beam 1008.

Turning now to FIG. 12, an illustration of a configuration for N platforms in a solar cell collector system is depicted in accordance with an advantageous embodiment. In this illustrative example, a fourth configuration 1200 is an example of one implementation for a configuration for platforms in the solar collector system 200 in FIG. 2.

The fourth configuration 1200 includes N platforms 1201, a beam 1202 connected to the N platforms 1201, and 2N load points for the beam 1202. In this illustrative example, N may be any number ranging between one and infinity. As depicted, the beam 1202 has load points 1204 that equal twice the number of platforms with which the beam 1202 may be associated. The load points 1204 are the connection points at which members may be connected to the beam 1202 to connect the beam 1202 to the platforms.

The load points 1204 are substantially equally spaced apart in the fourth configuration 1200. A distance 1212 is the distance between any two load points in the load points 1204. The distance 1212 is about 0.5 L in this illustrative example.

Additionally, support points 1214 are the points on the beam 1202 at which a support structure, such as the support structure 240 in FIG. 2, may be connected to the beam 1202. The support points 1214 are substantially equally spaced apart. A distance 1220 is the distance between any two support points. The distance 1220 is L in this illustrative example.

When the beam 1202 is attached to the N platforms 1201, the orientation of the N platforms 1201 remains substantially unchanged in response to a load applied to the platforms in the fourth configuration 1200.

Figure 13:
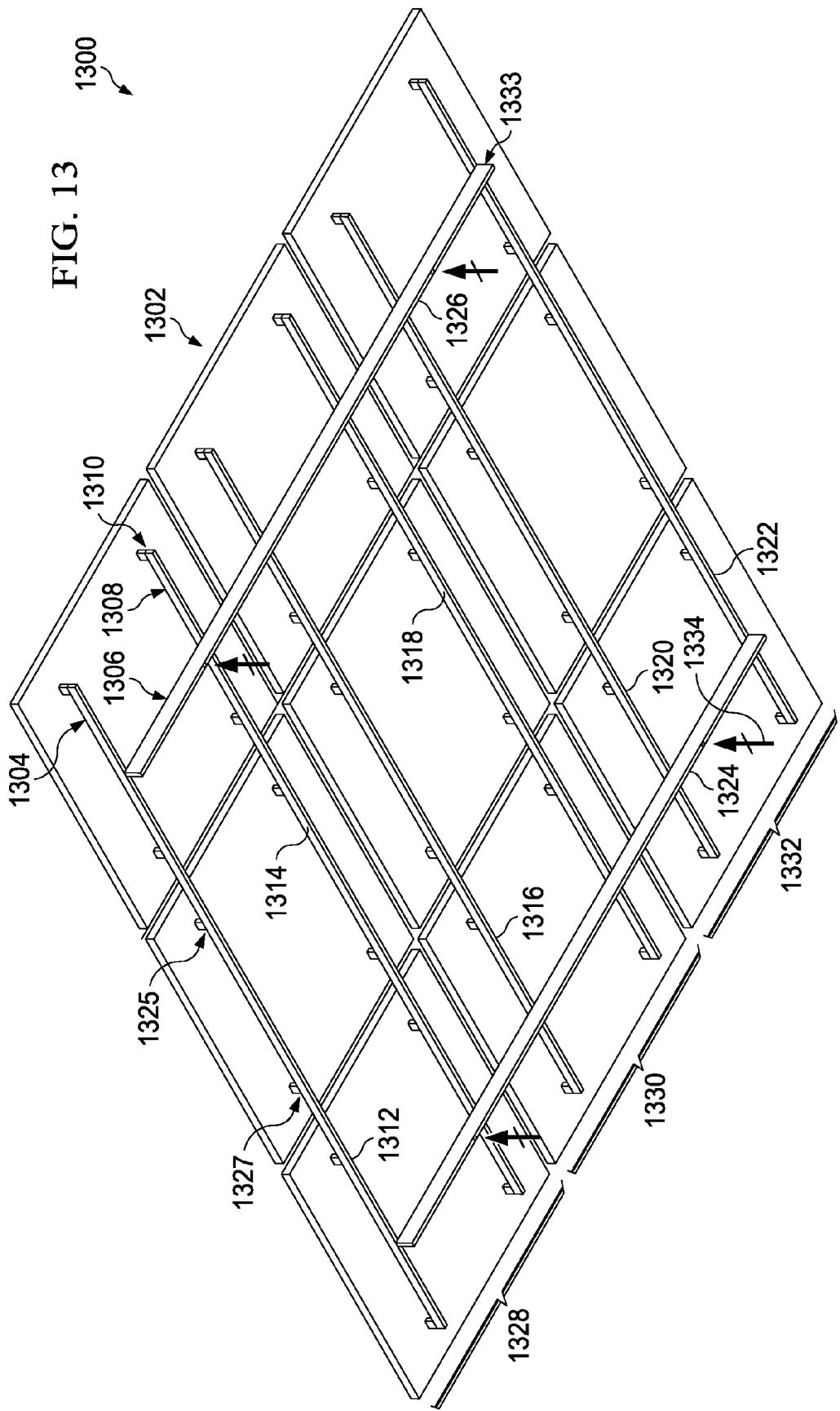
FIG. 13 is an illustration of a bottom perspective view of a solar collector system having a three by three array of platforms in accordance with an advantageous embodiment.

With reference now to FIG. 13, an illustration of a bottom perspective view of a solar collector system having a three by three array of platforms is depicted in accordance with an advantageous embodiment. In this illustrative example, a solar collector system 1300 is an example of one implementation of the solar collector system 200 in FIG. 2 with the support structure 240 in FIG. 2 removed.

As depicted, the solar collector system 1300 includes platforms 1302 arranged in rows, with each row having three platforms. In this manner, the solar collector system 1300 is a three by three array of platforms.

The platforms 1302 are connected to beams 1304 in a configuration based on the second configuration 700 in FIG. 7. The beams 1304 include a first group of beams 1306 and a second group of beams 1308 that form a hierarchy 1310. In other words, the first group of beams 1306 forms a first level in the hierarchy 1310, and the second group of beams 1308 forms a second level in the hierarchy 1310. The first group of beams 1306 includes a beam 1324 and a beam 1326. The second group of beams 1308 includes beams 1312, 1314, 1316, 1318, 1320, and 1322.

As depicted, the first group of beams 1306 is connected to the second group of beams 1308. The second group of beams 1308 is arranged substantially perpendicular to the first group of beams 1306 in this illustrative example. Further, the beam 1324 and the beam 1326 are connected to the second group of beams 1308 at connection points 1333. The connection points 1333 are the load points for the beam 1324 and the beam 1326. As depicted, the beam 1324 and the beam 1326 each have six load points in keeping with the second configuration 700 in FIG. 7.

In this illustrative example, the second group of beams 1308 is connected to the platforms 1302 by members 1325 at connection points 1327 on the second group of beams 1308. The connection points 1327 are the load points for the second group of beams 1308. The beam 1312 and the beam 1314 are connected to a row 1328 of the platforms 1302. The beam 1316 and the beam 1318 are connected to a row 1330 of the platforms 1302. The beam 1320 and the beam 1322 are connected to a row 1332 of the platforms 1302. As depicted, each of the rows 1328, 1330, and 1332 are connected to the second group of beams 1308 using the second configuration 700 in FIG. 7.

Additionally, a support structure (not shown), such as the support structure 240 in FIG. 2, may be connected to the first group of beams 1306 at support points 1334 on the first group of beams 1306.

In this illustrative example, the positions of the connection points 1327, the connection points 1333, and the support points 1334 are selected such that the orientation of the platforms 1302 remains substantially unchanged in response to a substantially uniformly distributed load applied to the platforms 1302.

Figure 14:
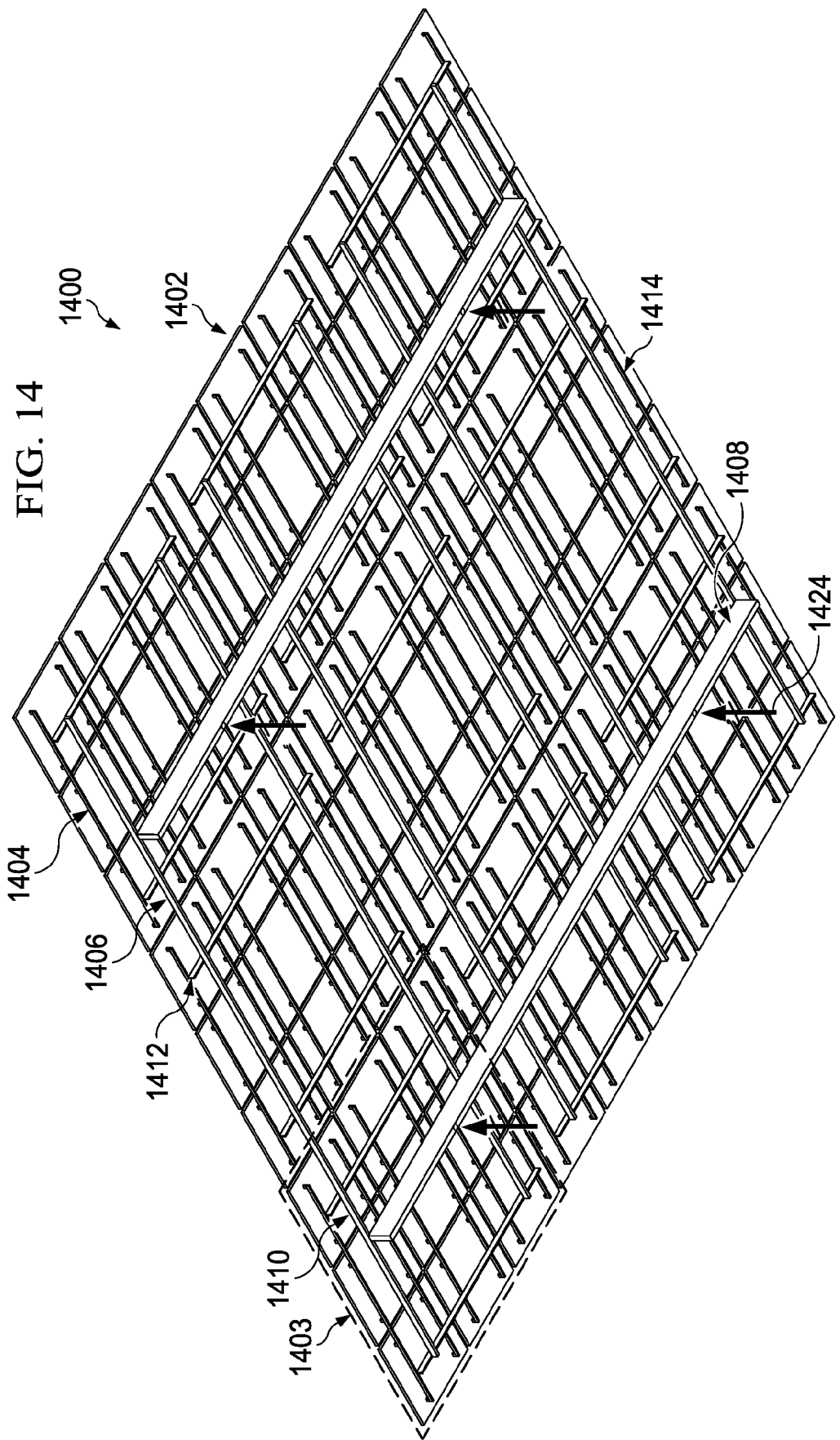
FIG. 14 is an illustration of a bottom perspective view of a solar collector system having a nine by nine array of platforms in accordance with an advantageous embodiment.

With reference now to FIG. 14, an illustration of a bottom perspective view of a solar collector system having a nine by nine array of platforms is depicted in accordance with an advantageous embodiment. In this illustrative example, a solar collector system 1400 is an example of one implementation of the solar collector system 200 with the support structure 240 in FIG. 2 removed.

As depicted, the solar collector system 1400 includes platforms 1402. The platforms 1402 are arranged in a nine by nine array of platforms. In particular, this nine by nine array of platforms may be grouped as nine separate three by three arrays of platforms. The three by three array of platforms 1403 is an example of one of these nine different arrays.

The solar collector system 1400 also includes beams 1404 connected to the platforms 1402. The beams 1404 include a first group of beams 1408, a second group of beams 1410, a third group of beams 1412, and a fourth group of beams 1414. Each of these groups of beams forms a level of hierarchy in a hierarchy 1406 for the beams 1404. In this manner, the beams 1404 have four levels of hierarchy in this illustrative example.

In this illustrative example, the first group of beams 1408 and the third group of beams 1412 are substantially parallel to each other. The second group of beams 1410 and the fourth group of beams 1414 are substantially parallel to each other. Further, the first group of beams 1408 and the third group of beams 1412 are substantially perpendicular to the second group of beams 1410 and the fourth group of beams 1414.

The first group of beams 1408, the second group of beams 1410, the third group of beams 1412, and the fourth group of beams 1414 form a first level, a second level, a third level, and a fourth level in a hierarchy of beams for the solar collector system 1400.

In this illustrative example, the first group of beams 1408 is connected to a support structure (not shown), such as support structure 240 in FIG. 2, at support points 1424. The first group of beams 1408 is connected to the second group of beams 1410 at connection points using the second configuration 700 in FIG. 7. The second group of beams 1410 is connected to the third group of beams 1412 at connection points using the second configuration 700 in FIG. 7. Further, the third group of beams 1412 is connected to the fourth group of beams 1414 at connection points using the second configuration 700 in FIG. 7. The fourth group of beams 1414 is connected to the platforms 1402 at connection points using the second configuration 700 in FIG. 7. These different connection points function as load points.

For example, each beam in a particular level of hierarchy in the beams 1404 has two support points that function as load points for the beams in a lower level of hierarchy connected to the beam. With four levels of hierarchy, the first level is the lowest level of hierarchy, and the fourth level is the highest level of hierarchy in these illustrative examples.

As one illustrative example, a beam in the second group of beams 1410 has two support points that function as load points for the beams in the first group of beams 1408 connected to the beam in the second group of beams 1410. Further, loads on the second group of beams 1410 may be transferred to the first group of beams 1408 at these load points.

Further, a substantially uniformly distributed load on the platforms 1402 is transferred to the fourth group of beams 1414 at the connection points between the fourth group of beams 1414 and the platforms 1402. In other words, these connections points are support points for the platforms 1402.

Figure 15:
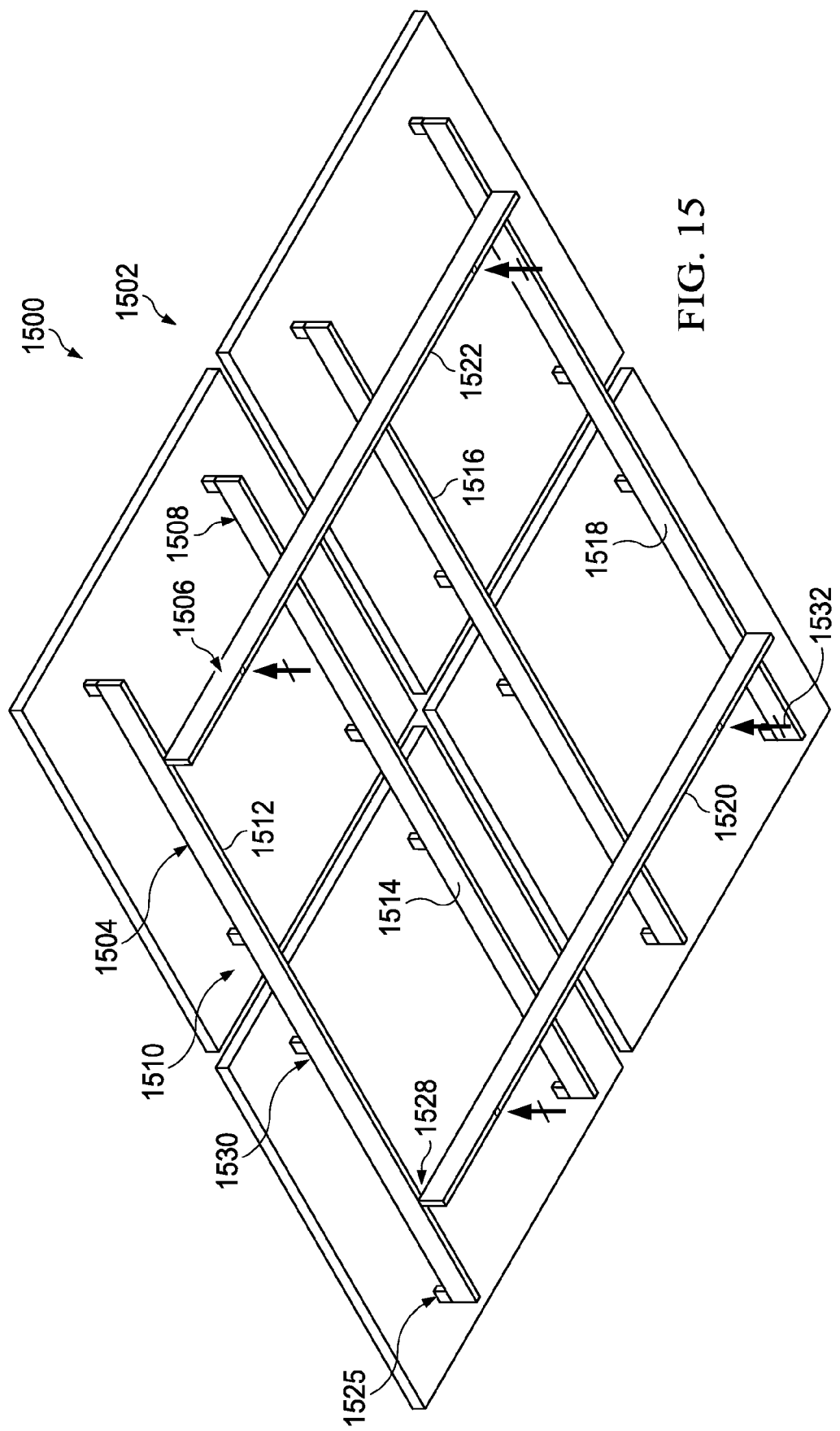
FIG. 15 is an illustration of a bottom perspective view of a solar collector system having a two by two array of platforms in accordance with an advantageous embodiment.

With reference now to FIG. 15, an illustration of a bottom perspective view of a solar collector system having a two by two array of platforms is depicted in accordance with an advantageous embodiment. In this illustrative example, a solar collector system 1500 is an example of one implementation of the solar collector system 200 with the support structure 240 in FIG. 2 removed.

In this illustrative example, the solar collector system 1500 includes platforms 1502 arranged in a two by two array. In other words, the platforms 1502 are arranged in two rows, with each row having two platforms.

The platforms 1502 are connected to beams 1504 in a configuration based on the third configuration 1000 in FIG. 10. The beams 1504 include a first group of beams 1506 and a second group of beams 1508 that form a hierarchy 1510. In other words, the first group of beams 1506 forms a first level in the hierarchy 1510, and the second group of beams 1508 forms a second level in the hierarchy 1510. The first group of beams 1506 includes a beam 1520 and a beam 1522. The second group of beams 1508 includes beams 1512, 1514, 1516, and 1518.

In this illustrative example, the first group of beams 1506 is connected to a support structure (not shown), such as the support structure 240 in FIG. 2, at support points 1532. Further, the first group of beams 1506 is connected to the second group of beams 1508 at connection points 1528. The second group of beams 1508 are arranged substantially perpendicular to the first group of beams 1506 in this illustrative example. The second group of beams 1508 is connected to the platforms 1502 by members 1525 at connection points 1530.

Connection points 1530 are the load points for the second group of beams 1508. Connection points 1528 are the load points for the first group of beams 1506. In this illustrative example, the first group of beams 1506 is connected to the second group of beams 1508 using the third configuration 1000 in FIG. 10. Further, each of the beam 1520 and the beam 1522 has two support points. The second group of beams 1508 is connected to the platforms 1502 using the third configuration 1000 in FIG. 10. Each of the beams 1512, 1514, 1516, and 1518 also has two support points.

In this illustrative example, the positions of the connection points 1528, the connection points 1530, and the support points 1532 for the support structure (not shown) are selected such that the orientation of the platforms 1502 remains substantially unchanged in response to a substantially uniformly distributed load applied to the platforms 1502.

Figure 16:
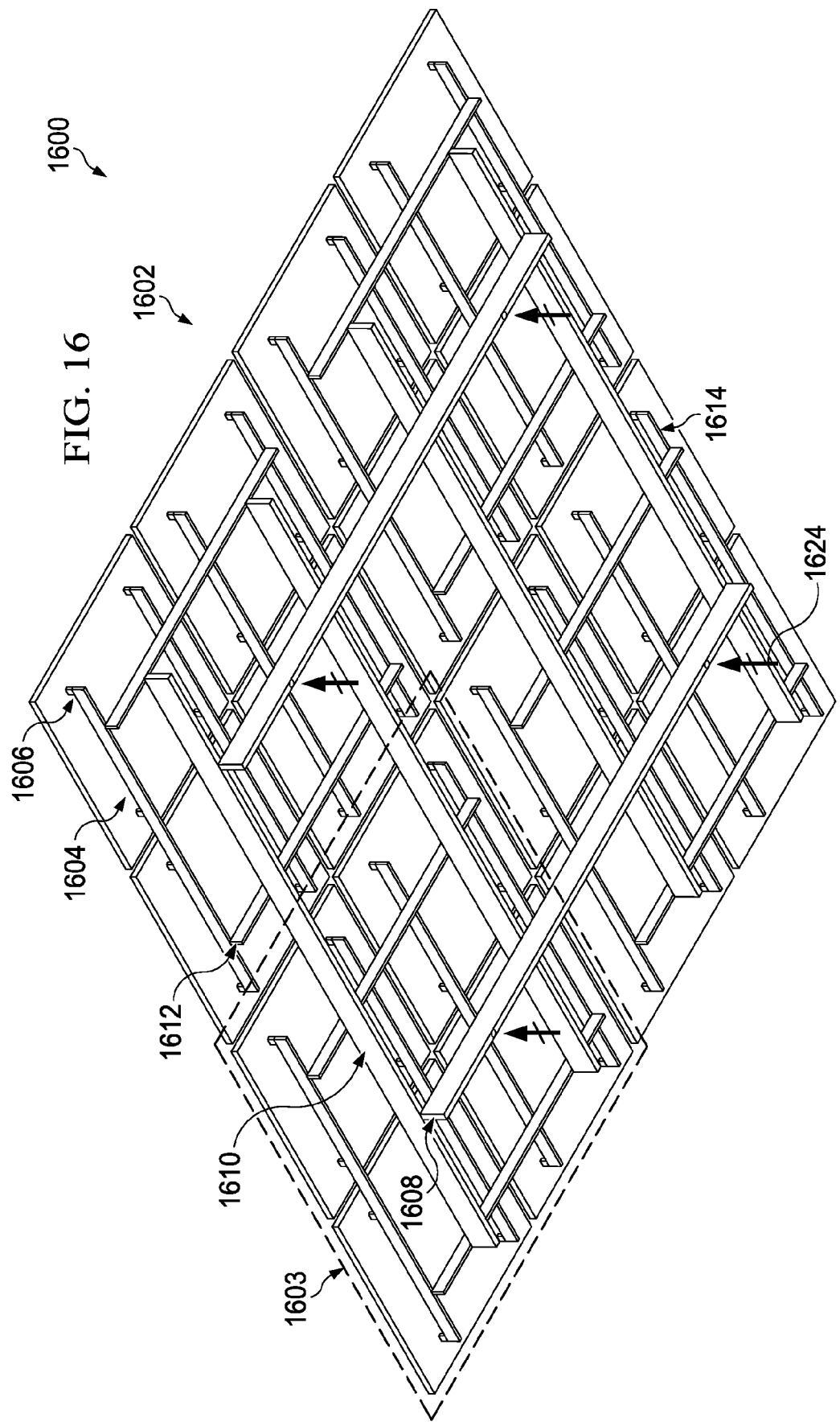
FIG. 16 is an illustration of a bottom perspective view of a solar collector system having a four by four array of platforms in accordance with an advantageous embodiment.

Turning now to FIG. 16, an illustration of a bottom perspective view of a solar collector system having a four by four array of platforms is depicted in accordance with an advantageous embodiment. In this illustrative example, a solar collector system 1600 is an example of one implementation for the solar collector system 200 in FIG. 2 without a support structure.

As depicted, the solar collector system 1600 includes platforms 1602 arranged in a four by four array. In particular, this four by four array of platforms may be grouped as four separate two by two arrays of platforms. Two by two array of platforms 1603 is an example of one of these four arrays.

The solar collector system 1600 also includes beams 1604 connected to the platforms 1602. The beams 1604 include a first group of beams 1608, a second group of beams 1610, a third group of beams 1612, and a fourth group of beams 1614. Each of these groups of beams forms a level of hierarchy in a hierarchy 1606 for the beams 1604. In this manner, the beams 1604 have four levels of hierarchy in this illustrative example.

In this illustrative example, the first group of beams 1608 and the third group of beams 1612 are substantially parallel to each other. The second group of beams 1610 and the fourth group of beams 1614 are substantially parallel to each other. Further, the first group of beams 1608 and the third group of beams 1612 are substantially perpendicular to the second group of beams 1610 and the fourth group of beams 1614.

The first group of beams 1608, the second group of beams 1610, the third group of beams 1612, and the fourth group of beams 1614 form a first level, a second level, a third level, and a fourth level in a hierarchy of beams for the solar collector system 1600.

In this illustrative example, the first group of beams 1608 may be connected to a support structure, such as support structure 240 in FIG. 2, at support points 1624.

The first group of beams 1608 is connected to the second group of beams 1610 at connection points using the third configuration 1000 in FIG. 10. The second group of beams 1610 is connected to the third group of beams 1612 at connection points using the third configuration 1000 in FIG. 10. Further, the third group of beams 1612 is connected to the fourth group of beams 1614 at connection points using the third configuration 1000 in FIG. 10.

The fourth group of beams 1614 is connected to the platforms 1602 at connection points using the third configuration 1000 in FIG. 10. These different connection points function as load points.

For example, each beam in a particular level of hierarchy in the beams 1604 has two support points that function as load points for the beams in a lower level of hierarchy connected to the beam. For example, a beam in the second group of beams 1610 has two support points that function as load points for the beams in the first group of beams 1608 connected to the beam in the second group of beams 1610. Further, loads on the second group of beams 1610 may be transferred to the first group of beams 1608 at these load points.

Figure 17:
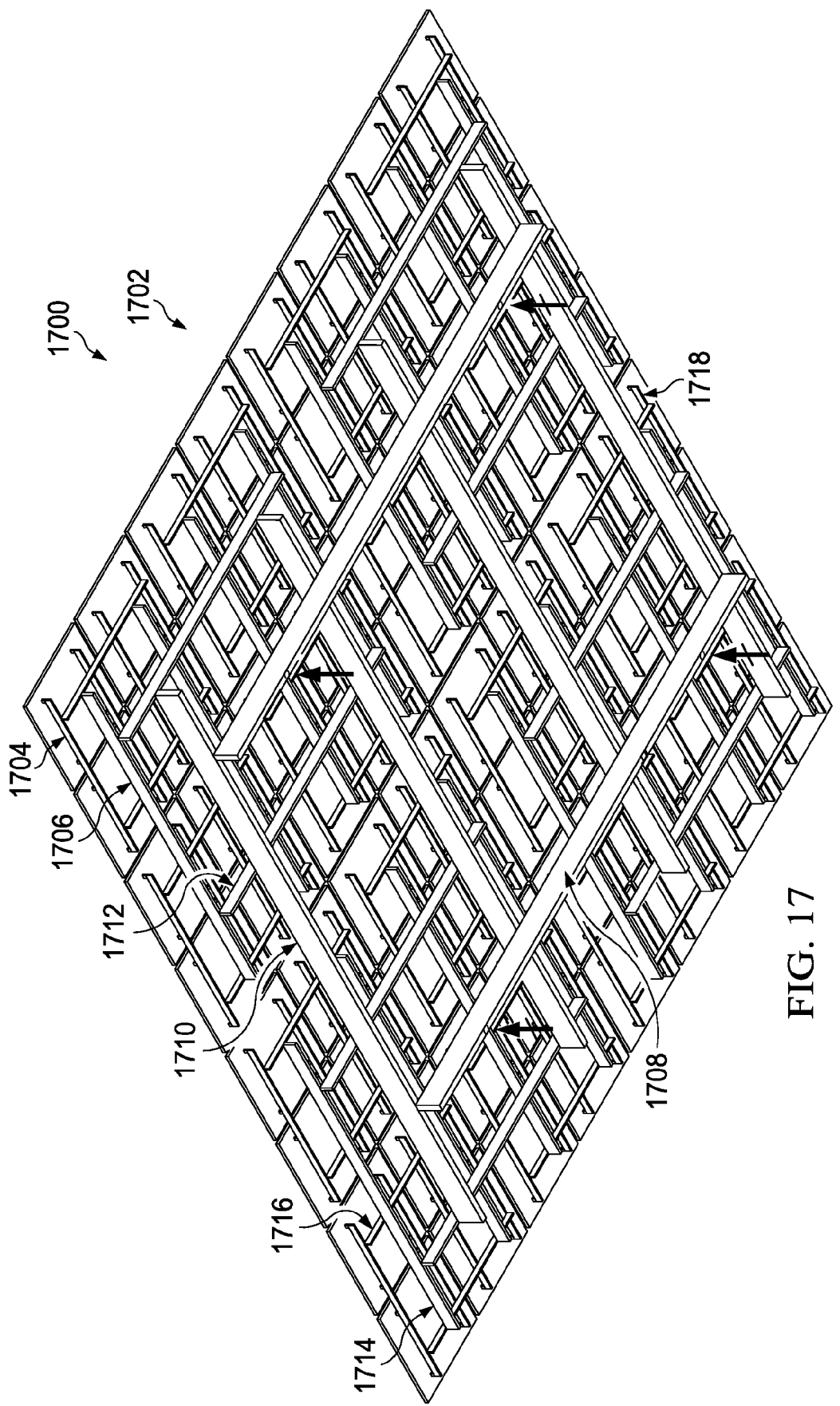
FIG. 17 is an illustration of a bottom perspective view of a solar collector system having an eight by eight array of platforms in accordance with an advantageous embodiment.

With reference now to FIG. 17, an illustration of a bottom perspective view of a solar collector system having an eight by eight array of platforms is depicted in accordance with an advantageous embodiment. In this illustrative example, a solar collector system 1700 is another example of one implementation for the solar collector system 200 in FIG. 2 without a support structure.

As depicted, the solar collector system 1700 includes platforms 1702 and beams 1704 connected to the platforms 1702. The beams 1704 include a first group of beams 1708, a second group of beams 1710, a third group of beams 1712, a fourth group of beams 1714, a fifth group of beams 1716, and a sixth group of beams 1718. Each of these groups of beams forms a level of hierarchy in a hierarchy 1706 for the beams 1704. In this manner, the beams 1704 have six levels of hierarchy in this illustrative example. All six levels of hierarchy for the beams 1704 are arranged using the third configuration 1000 in FIG. 10.

Figure 18:
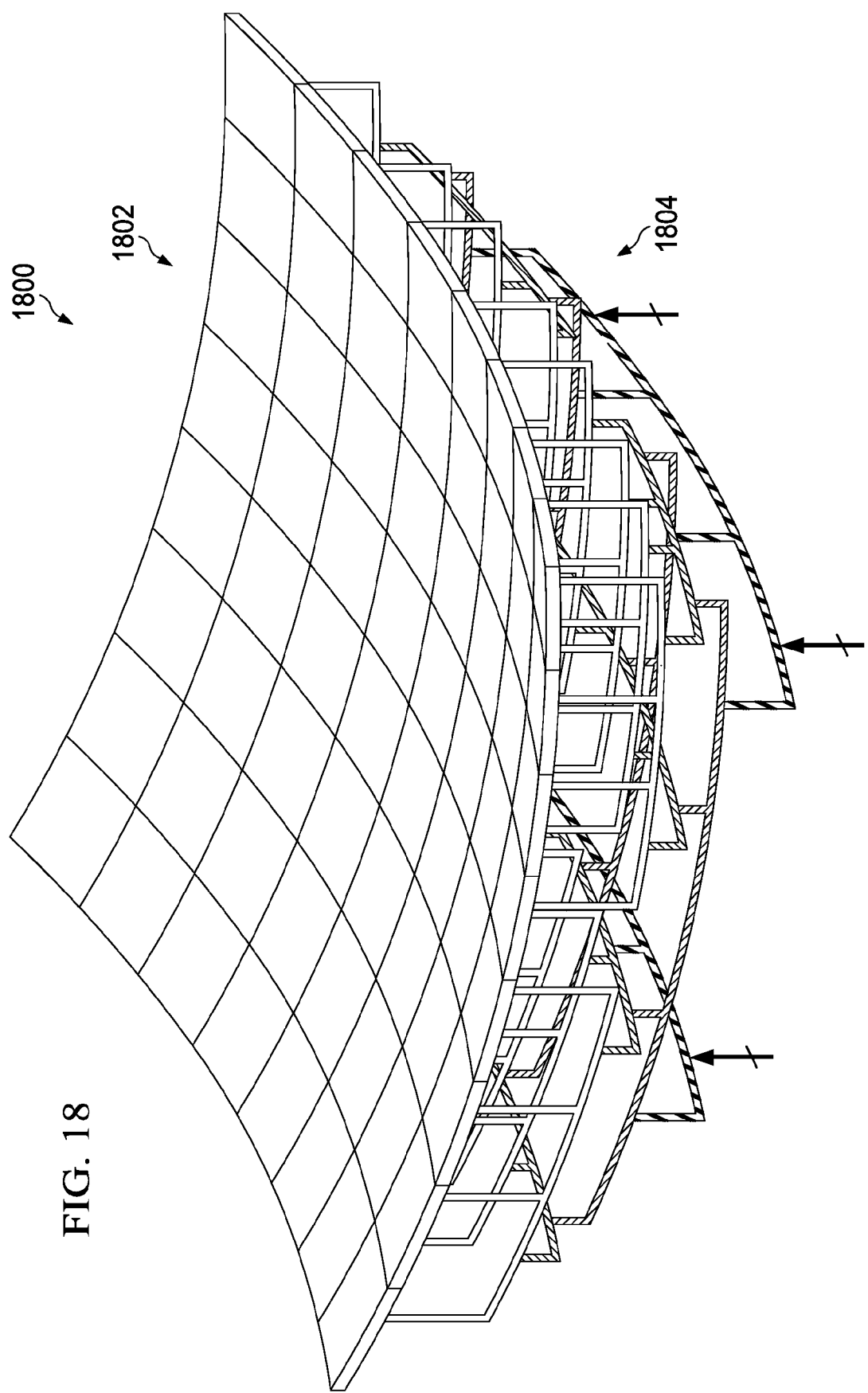
FIG. 18 is an illustration of a solar collector system in accordance with an advantageous embodiment.

With reference now to FIG. 18, an illustration of a solar collector system is depicted in accordance with an advantageous embodiment. A solar collector system 1800 is an example of one implementation for the solar collector system 200 in FIG. 2.

As depicted, the solar collector system 1800 comprises a number of platforms 1802 and beams 1804 connected to the number of platforms 1802. In this illustrative example, the number of platforms 1802 has a curved shape. Each of the platforms in the number of platforms 1802 may have the curved shape and/or the shape for the number of platforms 1802 as a whole may have the curved shape.

The number of platforms 1802 may take the form of a number of solar collectors, a reflective film, and/or other suitable types of platforms. As one illustrative example, the number of platforms 1802 may be an eight by eight array of platforms in which the array as a whole has the curved shape. In another example, the number of platforms 1802 may be a single sheet of a reflective film configured to have the curved shape.

In these illustrative examples, the beams 1804 are configured to support the number of platforms 1802 having the curved shape regardless of the number or type of platforms connected to the beams 1804.

Figure 19:
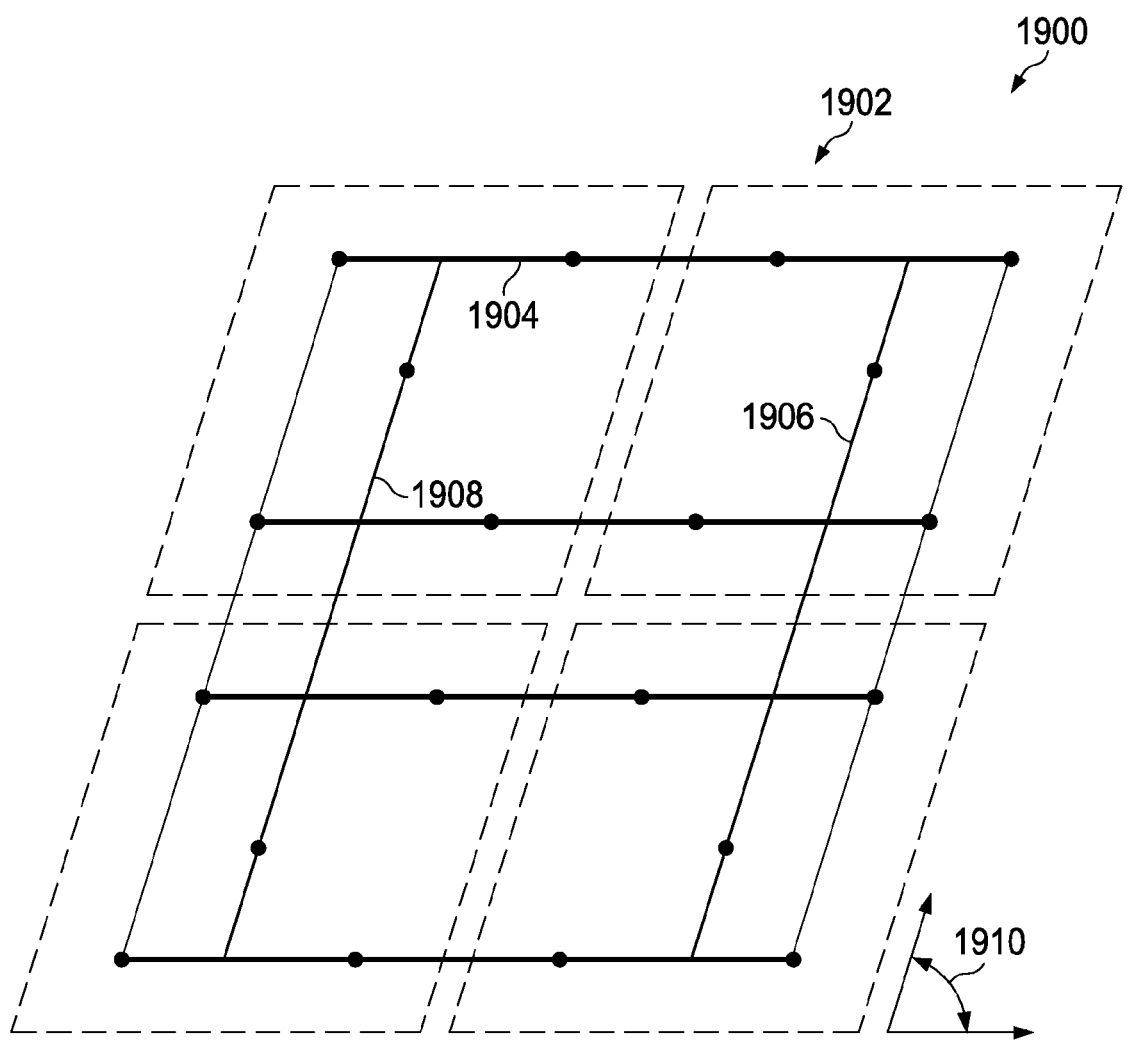
FIG. 19 is an illustration of a solar collector system in accordance with an advantageous embodiment.

With reference now to FIG. 19, an illustration of a solar collector system is depicted in accordance with an advantageous embodiment. In this illustrative example, a solar collector system 1900 is another example of one implementation for the solar collector system 200 in FIG. 2. As depicted, the solar collector system 1900 comprises platforms 1902 and a number of beams 1904 connected to the platforms 1902. In this illustrative example, the platforms 1902 have the shape of a parallelogram.

As illustrated, the number of beams 1904 includes a first group of beams 1906 and a second group of beams 1908. The second group of beams 1908 is connected to the first group of beams 1906 at an angle 1910 in this illustrative example. The angle 1910 is theta and is an angle that is less than about 90 degrees. In other words, the first group of beams 1906 and the second group of beams 1908 are not arranged substantially perpendicular to each other, as compared to other beams, such as the first group of beams 1506 and the second group of beams 1508 in FIG. 15.

In this manner, different groups of beams may be arranged at different angles to each other to provide support for platforms, depending on the implementation. The angles for arranging the groups of beams are selected such that an orientation of the platforms remains substantially constant in response to a substantially uniformly distributed load on the platforms.

Figure 20:
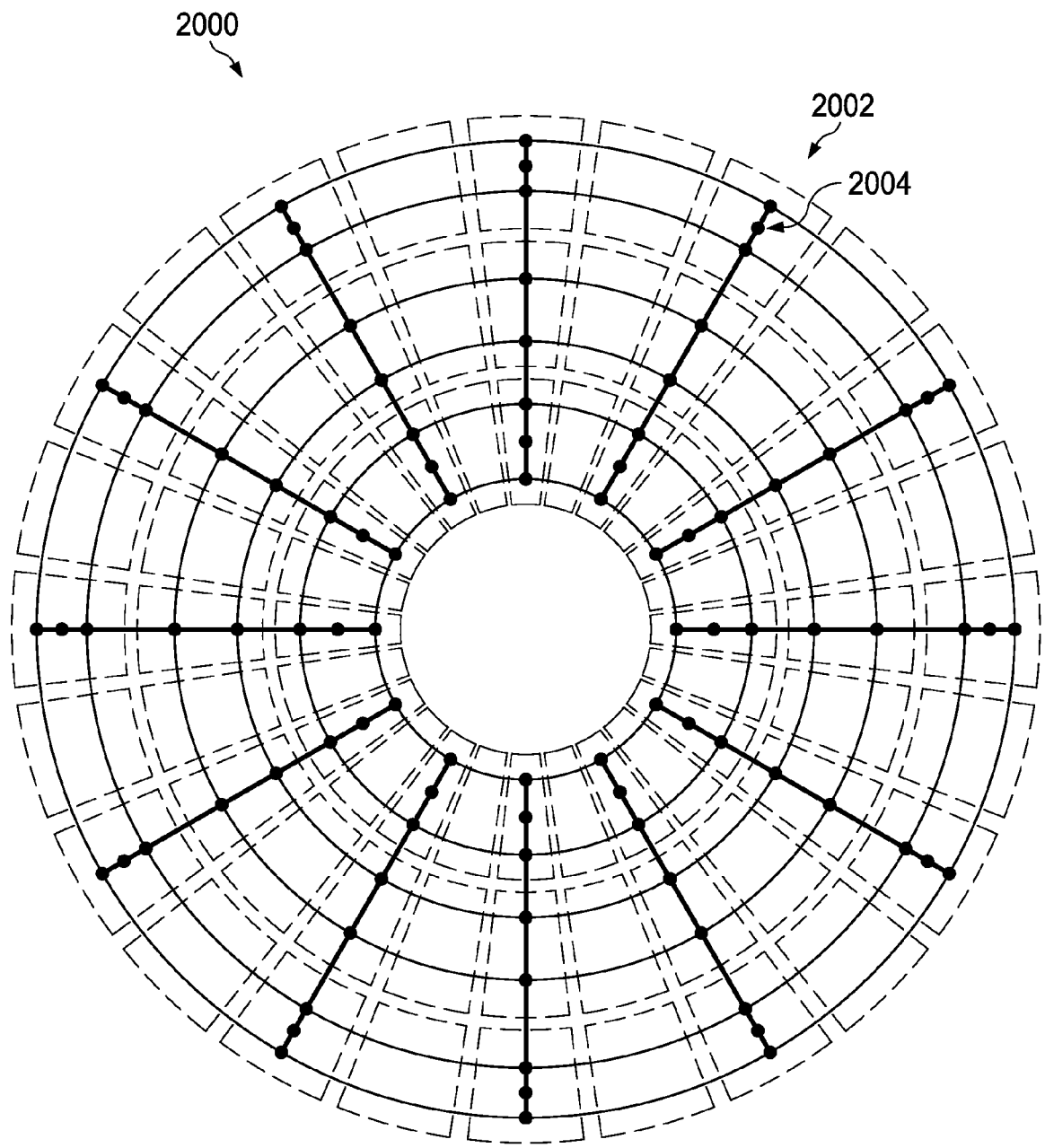
FIG. 20 is an illustration of a solar collector system in accordance with an advantageous embodiment.

With reference now to FIG. 20, an illustration of a solar collector system is depicted in accordance with an advantageous embodiment. In this illustrative example, a solar collector system 2000 is yet another example of one implementation for the solar collector system 200 in FIG. 2. The solar collector system 2000 comprises platforms 2002 and beams 2004 connected to the platforms 2002. As depicted, the platforms 2002 are arranged in a substantially planar circular shape.

In this illustrative example, the beams 2004 are arranged having a hierarchy and are arranged using the second configuration 700 in FIG. 7 and the fourth configuration 1200 in FIG. 12.

As illustrated in this example, any combination of the first configuration 400 in FIG. 4, the second configuration 700 in FIG. 7, the third configuration 1000 in FIG. 10, and the fourth configuration 1200 in FIG. 12 may be used to arrange beams to provide support for platforms in a solar collector system. The combination of configurations used is selected such that an orientation of the platforms remains substantially constant in response to a substantially uniformly distributed load on the platforms.

Figure 21:
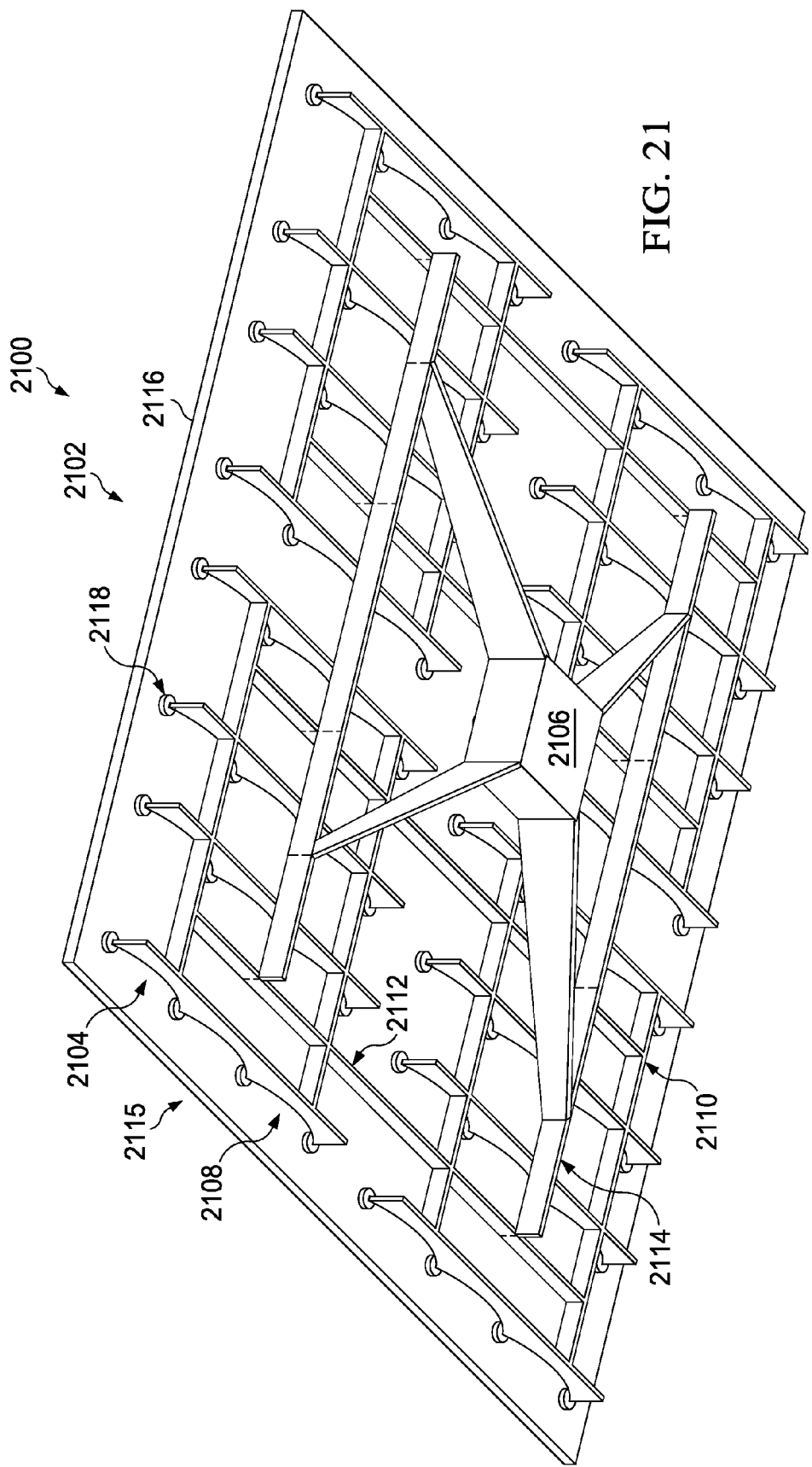
FIG. 21 is an illustration of a solar collector system in accordance with an advantageous embodiment.

With reference now to FIG. 21, an illustration of a solar collector system is depicted in accordance with an advantageous embodiment. A solar collector system 2100 is an example of one implementation for the solar collector system 200 in FIG. 2. As depicted, the solar collector system 2100 includes a mirror 2102, beams 2104, and a support structure 2106.

In this illustrative example, the beams 2104 includes a first group of beams 2108, a second group of beams 2110, a third group of beams 2112, and a fourth group of beams 2114. The first group of beams 2108, the second group of beams 2110, the third group of beams 2112, and the fourth group of beams 2114 form a hierarchy 2115 for the beams 2104.

As depicted, the first group of beams 2108 is connected the support structure 2106. The first group of beams 2108 is connected to the second group of beams 2110 using the third configuration 1000 in FIG. 10. The second group of beams 2110 is connected to the third group of beams 2112 using the third configuration 1000 in FIG. 10. The third group of beams 2112 is connected to the fourth group of beams 2114 using the third configuration 1000 in FIG. 10. Further, the fourth group of beams 2114 is connected to side 2116 of the mirror 2102 at connection points 2118 using the third configuration 1000 in FIG. 10.

The third configuration 1000 depicted in FIG. 10 may be used with solar collector system 2100, because the deflections of all the connection points in the third configuration 1000 in FIG. 10 are substantially the same. In other words, the connection points do not move relative to each other but together. In this manner, the third configuration 1000 is especially suited for a solar collector system comprising a single platform, such as a single thin monolithic sheet.

The illustrations of the first configuration 400 in FIGS. 4 and 5, the second configuration 700 in FIGS. 7 and 8, the third configuration 1000 in FIG. 10, and the fourth configuration 1200 in FIG. 12 are not meant to imply physical or architectural limitations to the manner in which different advantageous embodiments may be implemented. Other components in addition to and/or in place of the ones illustrated may be used. Some components may be unnecessary in some advantageous embodiments.

For example, in some illustrative examples, all groups of beams at all levels of hierarchies may be arranged substantially parallel to each other. Each group of beams at each level of hierarchy may be adjacent to groups of beams.

Further, in other illustrative examples, any combination of the first configuration 400 in FIG. 4, the second configuration 700 in FIG. 7, the third configuration 1000 in FIG. 10, and the fourth configuration 1200 in FIG. 12 may be used to arrange beams for a solar collector system.

In these illustrative examples, the different groups of beams for the different levels of hierarchy have been depicted stacked. However, in other illustrative examples, some groups of beams may be nested within other groups of beams. Still further, the lengths of the different members connecting a group of beams to another group of beams or to platforms may be substantially the same or may be different relative to each other, depending on the implementation.

With reference now to FIG. 22, an illustration of loads being applied on a beam is depicted in accordance with an advantageous embodiment. In this illustrative example, a beam 2200 is an example of a beam in the number of beams 208 in FIG. 2. The beam 2200 has an end 2201 and an end 2103. Further, the beam 2200 has load points 2202, 2204, 2206, and 2208. In this illustrative example, the load applied to these load points P is substantially the same for the load points 2202, 2204, 2206, and 2208. Additionally, a support structure may be connected to the beam 2200 at a support point 2210 and a support point 2212 on the beam 2200.

In this depicted example, the positions of the support point 2210 and the support point 2212 on the beam 2200 may be selected based on the selection of the support point 1026 and 1028 for the first beam 1006 as described in FIG. 10. In other words, the positions of the support point 2210 and the support point 2212 may be selected such that deflection does not occur at these support points when four substantially equal loads are applied to the beam at the load points 2202, 2204, 2206, and 2208.

As depicted, the positions of the support point 2210 and the support point 2212 on the beam 2200 may be adjusted. However, adjustments to the positions of these support points may require changes to the bending stiffness of portions of the beam 2200 such that deflection remains substantially absent at the support points in response to four substantially equal loads applied to the beam at the load points 2202, 2204, 2206, and 2208.

For example, a portion 2211 and a portion 2213 of the beam 2200 have a greater bending stiffness, as compared to a portion 2215 of the beam 2200. This difference in bending stiffness for the two portions of the beam 2200 may be selected in order to adjust the positions of the support point 2210 and the support point 2212 on the beam 2200. As depicted, the support point 2210 and the support point 2212 are positioned away from the end 2201 and the end 2103, respectively, of the beam 2200 by a distance 2216, $L_E$.

Turning now to FIG. 23, an illustration of loads being applied on a beam is depicted in accordance with an advantageous embodiment. In this illustrative example, the loads applied to the beam 2200 from FIG. 22 are not substantially equal loads. As depicted, the loads applied to the load point 2202 and the load point 2208 on the beam 2200 are about half the loads applied to the load point 2204 and the load point 2206. In other words, the amount of loading at the load point 2202 and the load point 2208 is one half of P.

In response to this difference in loads at the different load points, the positions of the support point 2210 and/or the support point 2212 may be changed and/or the bending stiffness of different portions of the beam 2200 may be changed such that deflection of the load points behaves in a desired manner. In particular, the desired behavior of the load points is that the deflection of load points 2202 and 2204 are substantially equal to each other and that the deflection of the load points 2206 and 2208 are substantially equal to each other in response to the loads applied to the load points 2202, 2204, 2206, and 2208.

In this illustrative example, the deflection of the load points 2202 and 2204 may be substantially half the deflection of the load points 2206 and 2208. However, in other illustrative examples, the load points may be configured to deflect with different proportions.

As depicted, the positions of support point 2210 and the support point 2212 are further inwards from the end 2201 and the end 2203, respectively, of the beam 2200, as compared to the positions of the support point 2210 and the support point 2212 in FIG. 22.

In particular, the support point 2210 and the support point 2212 are positioned away from the end 2201 and the end 2203, respectively, of the beam 2200 by a distance 2300, $2L_E$. Further, the bending stiffness of portion 2211 and the portion 2215 are increased.

With reference to FIG. 24, an illustration of loads being applied on a beam is depicted in accordance with an advantageous embodiment. In this illustrative example, different amounts of loads are applied to the load points 2202, 2204, 2206, and 2208. As depicted, the load applied at the load point 2202 is about half the load applied at the load point 2204 and the load point 2206. The load applied at the load point 2204 and the load point 2206 is P, and the load applied at the load point 2202 is 0.5P. Further, the load applied at the load point 2208 is 1.5P.

In response to these different loads being applied at the different load points, the positions of the support point 2210 and/or the support point 2212 may be changed and/or the bending stiffness of different portions of the beam 2200 changed such that deflection of the load point 2202 is substantially equal to the deflection of the load point 2204, and the deflection of the load point 2206 is substantially equal to the deflection of the load point 2208, in response to the loads applied to the load points 2202, 2204, 2206, and 2208.

In this illustrative example, a portion 2400 of the beam 2200 has a greater bending stiffness than a portion 2402 and a portion 2404 of the beam 2200. Further, the portion 2402 has a greater bending stiffness than the portion 2404 of the beam 2200. The support point 2210 has a position that is away from the end 2201 by a distance 2406, $2L_E$. The support point 2212 has a position that is away from the end 2203 by a distance 2408, $(\tfrac{2}{3}) L_E$.

In this manner, the positions for the support points on beams and/or the bending stiffness of different portions of the beam may be adjusted to take into account non-uniform loading of the load points for the beams and/or other suitable factors. Any combination of the adjustment to the positions for the support points on the beams and/or the bending stiffness of different portions of the beam described in FIG. 23 and FIG. 24 may be used. Further, different adjustments may be made at different levels of hierarchy for the beams.

Figure 25:
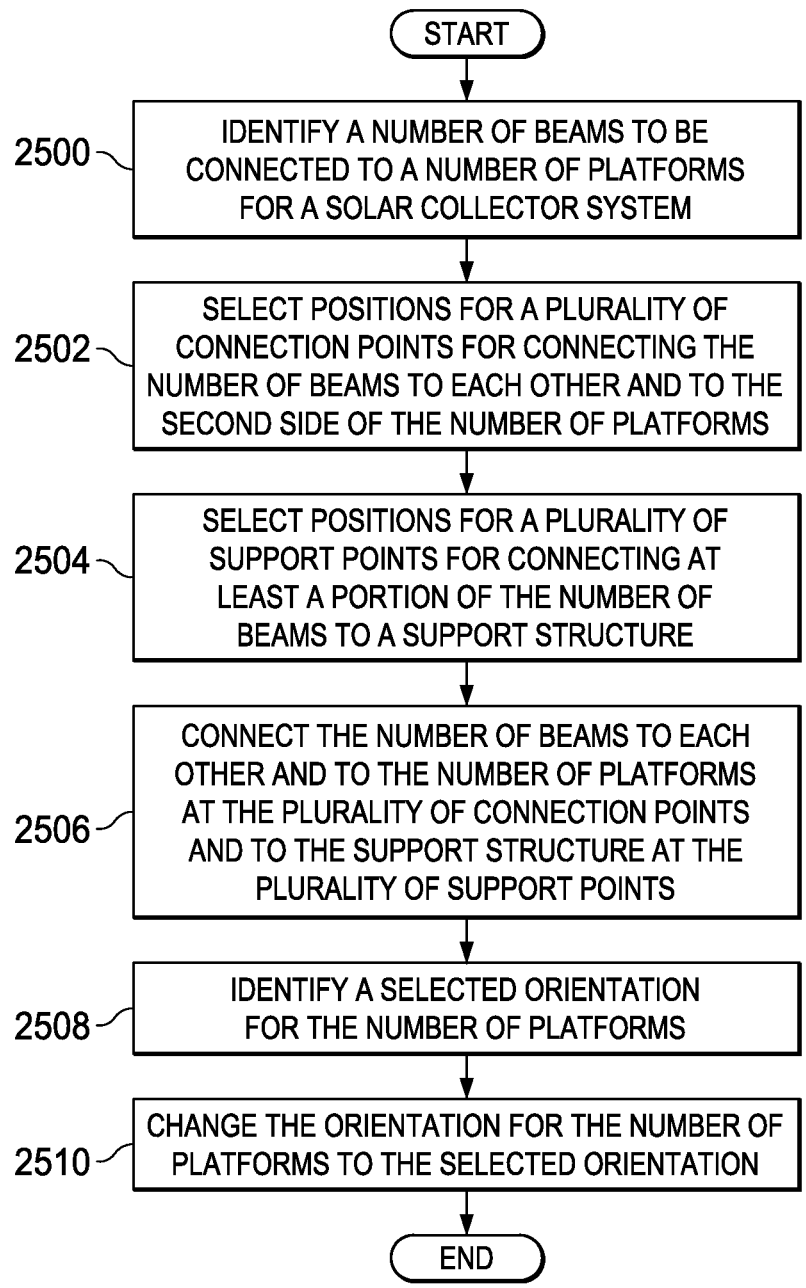
FIG. 25 is an illustration of a flowchart of a process for managing a solar collector system in accordance with an advantageous embodiment.

With reference now to FIG. 25, an illustration of a flowchart of a process for managing a solar collector system is depicted in accordance with an advantageous embodiment. The process illustrated in FIG. 25 may be implemented for the solar collector system 200 in FIG. 2.

The process begins by identifying a number of beams to be connected to a number of platforms for a solar collector system (operation 2500). The number of platforms has a first side and a second side. The number of beams is to be connected to the second side of the number of platforms. In this illustrative example, the number of platforms comprises a number of solar devices.

The process selects positions for a plurality of connection points for connecting the number of beams to each other and to the second side of the number of platforms (operation 2502). The process selects positions for a plurality of support points for connecting at least a portion of the number of beams to a support structure (operation 2504).

In this illustrative example, the positions for the plurality of connection points and the plurality of support points are selected such that an orientation of the number of platforms remains substantially unchanged in response to a load on the number of platforms. The load may be a substantially uniformly distributed load.

Thereafter, the process connects the number of beams to each other and to the number of platforms at the plurality of connection points and to the support structure at the plurality of support points (operation 2506). The plurality of connection points is configured to receive a plurality of loads applied at the plurality of connection points in response to the load on the number of platforms such that the orientation of the number of platforms remains substantially unchanged in response to the load on the number of platforms.

Further, the plurality of loads applied at the plurality of connection points causes the plurality of connection points to move. In this manner, the number of platforms may be moved in a direction along an axis in response to a load on the number of platforms with the orientation of the number of platforms remaining substantially unchanged. The axis may be, for example, substantially perpendicular to the number of platforms.

Thereafter, the process identifies a selected orientation for the number of platforms (operation 2508). The operation 2508 may be performed using a pointing system, such as the pointing system 244 in FIG. 2.

Thereafter, the orientation for the number of platforms is changed to the selected orientation (operation 2510), with the process terminating thereafter. When the number of beams is connected to the support structure and to the number of platforms at the plurality of support points and the plurality of connection points as described above, the selected orientation for the number of platforms also remains substantially unchanged in response to a load on the number of platforms.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a solar collector system comprising a number of platforms and a number of beams. The number of platforms has a first side and a second side. The number of platforms comprises a number of devices. The number of beams is connected to the second side of the number of collectors at a plurality of connection points. The number of beams is configured to allow movement of the plurality of connection points such that an orientation of the number of collectors remains substantially unchanged in response to a load on the number of collectors.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages, as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a plurality of platforms, each having a corresponding first side and a corresponding second side opposite the corresponding first side; and
a plurality of beams connected to corresponding second sides of the plurality of platforms at corresponding connection points, wherein the corresponding connection points are configured such that corresponding orientations of the plurality of platforms remain substantially unchanged in response to a load on the-plurality of platforms, wherein the corresponding connection points are configured to receive a plurality of loads applied at the plurality of connection points in response to the load on the plurality of platforms, and wherein at least a portion of the corresponding connection points is configured to move in response to the plurality of loads such that the corresponding orientations of the plurality of platforms remain substantially unchanged in response to the load; wherein the plurality of beams comprises a plurality of groups of beams forming a plurality of levels of hierarchy for the plurality of beams, wherein a lowest level of hierarchy in the plurality of levels of hierarchy for the plurality of beams is formed by a first group of beams in the plurality of groups of beams connected to a support structure and wherein a highest level of hierarchy in the plurality of levels of hierarchy for the plurality of beams is formed by a second group of beams in the plurality of groups of beams connected to the number of platforms.

2. The apparatus of claim 1, wherein the corresponding orientations of the plurality of platforms remain substantially unchanged in response to the load when each point on the plurality of platforms receives substantially a same amount of load at substantially a same point in time.

3. The apparatus of claim 1 further comprising:
a support structure connected to at least a portion of the plurality of beams at a corresponding plurality of support points.

4. The apparatus of claim 1, wherein each beam in a particular level of hierarchy in the plurality of levels of hierarchy has two support points that function as load points for beams in a lower level of hierarchy connected to the each beam.

5. The apparatus of claim 1, wherein the plurality of groups of beams comprises:
   a first group of beams, wherein the first group of beams is the group of beams in the plurality of groups of beams connected to the support structure at a plurality of support points, wherein the first group of beams forms a first level of hierarchy in the plurality of levels of hierarchy in which the first level of hierarchy is the lowest level of hierarchy; and
   a second group of beams connected to the first group of beams at a first plurality of connection points in the plurality of connection points, wherein the second group of beams forms a second level of hierarchy in the plurality of levels of hierarchy and wherein the first plurality of connection points are load points for the first group of beams.

6. The apparatus of claim 5, wherein:
   the second group of beams is connected to the plurality of platforms at a second plurality of connection points in the plurality of connection points to form the second level of hierarchy in which the second level of hierarchy is the highest level of hierarchy; wherein the second plurality of connection points are load points for the second group of beams; and
   the load on the plurality of platforms is transferred to the second group of beams at the second plurality of connection points and wherein loads on the second group of beams are transferred to the first group of beams at the first plurality of connection points such that corresponding orientations of the plurality of platforms remain substantially unchanged in response to the load.

7. The apparatus of claim 1, wherein the plurality of groups of beams comprises:
   a first group of beams, wherein the first group of beams is the group of beams in the plurality of groups of beams connected to the support structure at a plurality of support points, wherein the first group of beams forms a first level of hierarchy in the number of levels of hierarchy in which the first level of hierarchy is the lowest level of hierarchy;
   a second group of beams connected to the first group of beams at a first plurality of connection points in the plurality of connection points, wherein the second group of beams forms a second level of hierarchy in the plurality of levels of hierarchy; and
   a third group of beams connected to the second group of beams at a second plurality of connection points in the plurality of connection points and to the plurality of platforms at a third plurality of connection points in the plurality of connection points, wherein the third group of beams forms a third level of hierarchy in the number of levels of hierarchy in which the third level of hierarchy is the highest level of hierarchy, and wherein the first plurality of connection points are load points for the first group of beams, the second plurality of connection points are load points for the second group of beams, and the third plurality of connection points are load points for the third group of beams.

8. The apparatus of claim 7, wherein:
   the load on the plurality of platforms is transferred to the third group of beams at the third plurality of connection points;
   loads on the third group of beams are transferred to the second group of beams at the second plurality of connection points; and
   loads on the second group of beams are transferred to the first group of beams at the first plurality of connection points such that the orientation of the plurality of platforms remains substantially unchanged in response to the load on the plurality of platforms.

9. The apparatus of claim 3, wherein positions for the plurality of connection points and the plurality of support points are selected to allow movement of the plurality of connection points in a direction of an axis such that the orientation of the plurality of platforms remains substantially unchanged in response to the load on the plurality of platforms.

10. The apparatus of claim 3, wherein positions for the plurality of connection points and the plurality of support points and a bending stiffness for different portions of the plurality of beams are selected to allow movement of the plurality of connection points in a direction of an axis such that the orientation of the plurality of platforms remains substantially unchanged in response to the load on the plurality of platforms.

11. The apparatus of claim 1, wherein the plurality of platforms comprises three platforms arranged in a row and connected to each other by one beam in which the one beam has three load points in a first configuration;
   the three platforms arranged in a row and connected to each other by two beams in which each of the two beams has six load points in a second configuration;
   two platforms arranged in a row and connected by two beams in which each of the two beams has four load points in a third configuration; and
   N platforms arranged in a row and connected to each other by one beam in which the one beam has 2N load points in a fourth configuration.

12. The apparatus of claim 1 wherein the plurality of platforms are selected from the group consisting of: a solar cell, a mirror, a heliostat minor, an object having a reflective surface, a piece of glass, a microphone, a radio telescope element, a support pad, and combinations thereof.

13. The apparatus of claim 3, wherein the plurality of platforms, the plurality of beams, and the support structure form a solar collector system and further comprising:
   a pointing system configured to change an orientation of the solar collector system.

14. The apparatus of claim 5, wherein the second group of beams is arranged substantially perpendicular to the first group of beams.

15. A method comprising:
   in a device comprising:
      a plurality of platforms, each having a corresponding first side and a corresponding second side opposite the corresponding first side; and
      a plurality of beams connected to corresponding second sides of the plurality of platforms at corresponding connection points, wherein the corresponding connection points are configured such that corresponding orientations of the plurality of platforms remain substantially unchanged in response to a load on the plurality of platforms, wherein the corresponding connection points are configured to receive a plurality of loads applied at the plurality of connection points in response to the load on the plurality of platforms, and wherein at least a portion of the corresponding connection points is configured to move in response to the plurality of loads such that the corresponding orientations of the plurality of platforms remain substantially unchanged in response to the load;

wherein the plurality of beams comprises a plurality of groups of beams forming a plurality of levels of hierarchy for the plurality of beams, wherein a lowest level of hierarchy in the plurality of levels of hierarchy for the plurality of beams is formed by a first group of beams in the plurality of groups of beams connected to a support structure and wherein a highest level of hierarchy in the plurality of levels of hierarchy for the plurality of beams is formed by a second group of beams in the plurality of groups of beams connected to the number of platforms;

applying the load to the device; and responsive to applying the load, maintaining the corresponding orientations of the plurality of platforms.

16. The method of claim 15, wherein the device includes a support structure connected to at least a portion of the plurality of beams at a plurality of support points.

17. The method of claim 16, wherein the plurality of platforms, the plurality of beams, and the support structure form a solar collector system and wherein the method further includes:

changing the corresponding orientations for the plurality of platforms to selected orientations using a pointing system.

18. The method of claim 15, wherein each beam in a particular level of hierarchy in the plurality of levels of hierarchy has two support points that function as load points for beams in a lower level of hierarchy connected to the each beam.

19. The method of claim 15, wherein the plurality of groups of beams comprises:

a first group of beams, wherein the first group of beams is the group of beams in the plurality of groups of beams connected to the support structure at a plurality of support points, wherein the first group of beams forms a first level of hierarchy in the plurality of levels of hierarchy in which the first level of hierarchy is the lowest level of hierarchy; and a second group of beams connected to the first group of beams at a first plurality of connection points in the plurality of connection points, wherein the second group of beams forms a second level of hierarchy in the plurality of levels of hierarchy and wherein the first plurality of connection points are load points for the first group of beams.

20. The method of claim 19, wherein:

the second group of beams is connected to the plurality of platforms at a second plurality of connection points in the plurality of connection points to form the second level of hierarchy in which the second level of hierarchy is the highest level of hierarchy; wherein the second plurality of connection points are load points for the second group of beams; and the load on the plurality of platforms is transferred to the second group of beams at the second plurality of connection points and wherein loads on the second group of beams are transferred to the first group of beams at the first plurality of connection points such that corresponding orientations of the plurality of platforms remain substantially unchanged in response to the load.

21. The method of claim 15, wherein the plurality of groups of beams comprises:

a first group of beams, wherein the first group of beams is the group of beams in the plurality of groups of beams connected to the support structure at a plurality of support points, wherein the first group of beams forms a first level of hierarchy in the number of levels of hierarchy in which the first level of hierarchy is the lowest level of hierarchy;

a second group of beams connected to the first group of beams at a first plurality of connection points in the plurality of connection points, wherein the second group of beams forms a second level of hierarchy in the plurality of levels of hierarchy; and a third group of beams connected to the second group of beams at a second plurality of connection points in the plurality of connection points and to the plurality of platforms at a third plurality of connection points in the plurality of connection points, wherein the third group of beams forms a third level of hierarchy in the number of levels of hierarchy in which the third level of hierarchy is the highest level of hierarchy, and wherein the first plurality of connection points are load points for the first group of beams, the second plurality of connection points are load points for the second group of beams, and the third plurality of connection points are load points for the third group of beams.

* * * * *